US007944156B2

(12) United States Patent
Quazi

(10) Patent No.: US 7,944,156 B2
(45) Date of Patent: May 17, 2011

(54) ELECTRONIC BALLAST FOR HIGH INTENSITY DISCHARGE LAMPS

(75) Inventor: Fazle S. Quazi, Boulder, CO (US)

(73) Assignee: Energy Conservation Technologies, Inc., Boulder, CO (US)

( * ) Notice: Subject to any disclaimer, the term of this patent is extended or adjusted under 35 U.S.C. 154(b) by 527 days.

(21) Appl. No.: 12/048,076

(22) Filed: Mar. 13, 2008

(65) Prior Publication Data

US 2009/0230870 A1 Sep. 17, 2009

(51) Int. Cl.
*H05B 37/02* (2006.01)
(52) U.S. Cl. ........... 315/307; 315/85; 315/224; 315/360
(58) Field of Classification Search ............ 315/209 R, 315/219, 224–226, 276, 283, 291, 294, 307–308, 315/360
See application file for complete search history.

(56) References Cited

U.S. PATENT DOCUMENTS

| | | | | |
|---|---|---|---|---|
| 4,240,009 | A * | 12/1980 | Paul | 315/224 |
| 6,160,362 | A | 12/2000 | Shone et al. | |
| 6,376,998 | B1 * | 4/2002 | Okamoto et al. | 315/291 |
| 7,141,937 | B2 * | 11/2006 | Kumagai et al. | 315/224 |
| 7,187,136 | B2 | 3/2007 | Fiorello | |
| 7,199,528 | B2 | 4/2007 | Quazi | |
| 7,531,965 | B2 * | 5/2009 | Okamoto et al. | 315/209 R |
| 2002/0121866 | A1 | 9/2002 | Ellams | |
| 2003/0052622 | A1 * | 3/2003 | Okamoto et al. | 315/261 |
| 2003/0111968 | A1 | 6/2003 | Trestman | |
| 2006/0108940 | A1 * | 5/2006 | Kamoi | 315/209 R |
| 2007/0052373 | A1 * | 3/2007 | Hui et al. | 315/291 |
| 2007/0217235 | A1 | 9/2007 | Quazi | |

OTHER PUBLICATIONS

Hu; "Analysis and design of high-intensity-discharge lamp ballast for automotive headlamp"; Masters Thesis, Virginia Polytechnic Institute and State University; Nov. 19, 2001.
Moss; "Breakdown measurements in argon and xenon applicable to metal halide high intensity discharge lamps"; Thesis, University of Illinois at Urbana-Champaign; 2002.

* cited by examiner

*Primary Examiner* — Douglas W Owens
*Assistant Examiner* — Tung X Le
(74) *Attorney, Agent, or Firm* — Patton Boggs LLP

(57) ABSTRACT

The present High Intensity Discharge electronic lamp ballast uses a "set of controls" that can be performed by controlling energy delivery by the "line side converter" to the "lamp side inverter". This set of controls comprises: 1) open circuit voltage control, 2) breakdown voltage amplitude control, 3) glow-to-arc transition current control, 4) "initial arc development" current control, 5) "arc stabilization" current control, 6) lamp power control, 7) lamp dimming, 8) "lamp rectification" current control, and 9) short circuit and lamp fault protections. One of the primary advantages of this "line side converter" energy delivery control method is that it doesn't need to vary the lamp operating frequency to achieve the above-noted controls.

28 Claims, 18 Drawing Sheets

ELECTRONIC BALLAST FOR HIGH INTENSITY DISCHARGE LAMPS

FIELD OF THE INVENTION

This application discloses an electronic ballast device for High Intensity Discharge (HID) lamps which implements precise control of lamp ignition, lamp glow-to-arc currents, and operation of High Intensity Discharge lamps.

BACKGROUND OF THE INVENTION

High Intensity Discharge (HID) lamps are primarily used for large area illuminations. Unlike an incandescent bulb, a ballast device is necessary to ignite and operate an HID lamp. There are three primary functions of a ballast device, namely: 1) lamp ignition, 2) lamp power control, and 3) control of AC line transients and power quality. Most commonly used HID lamps are high-pressure sodium, ceramic, and pulse start metal halide lamps. All of these lamps require very high voltage for their ignition. Recently, electronic ballasts have been introduced to replace the old magnetic ballasts for higher operating efficiency and to improve lamp life and lumen maintenance by incorporating controlled ignition and lamp power regulation schemes.

There are two types of electronic ballasts: ballasts that operate HID lamps with a frequency that is higher than 20 kHz and ballasts that operate HID lamps with a frequency that is lower than 800 Hz. The primary advantage of low frequency operated electronic ballast is that it doesn't give rise to destructive acoustic resonance in the HID lamp. In particular, lower wattage ceramic metal halide electronic ballasts with a built-in integral igniter are designed to operate HID lamps at a low frequency. Although the lamp power regulation is important and offers other benefits, it is the proper lamp ignition, controlled glow-to-arc, and arc stabilizations that minimize electrode sputtering and ultimately determine the useful life of an HID lamp. Various schemes were proposed in the past to achieve these characteristics, but they are either too complex or lack completeness.

The starting and operating of an HID lamp involves five stages: two breakdowns, cold cathode, glow-to-arc transition, and thermionic arc. Prior to the initial breakdown, the HID lamp offers very high impedance. Upon application of a high voltage across an HID lamp, the induced electric field generates seed electrons which cause a breakdown. At the instant of the breakdown, the lamp impedance drops drastically but almost immediately increases to a higher value as the HID lamp enters into a glow discharge phase.

Further, following the breakdown, the HID lamp may enter into either a cold cathode or glow discharge phase, depending on whether or not mercury in the HID lamp has condensed on the electrodes. In order to sustain a glow discharge, the voltage across the lamp electrodes attains a higher value, but it is much lower than the breakdown voltage. The primary source of electrons during this period is secondary emission from the lamp electrodes by ion bombardment, which causes both sputtering and heating of the electrodes. The heating of the lamp electrodes raises the cathode temperature sufficiently high for thermionic emission to occur, which is the beginning of the glow-to-arc transition. In order to sustain thermionic emission, the ballast must supply sufficient current into the HID lamp for establishing a conductive arc between the lamp electrodes. Once the arc phase (takeover) begins, it takes between a few hundred seconds to a few minutes before it fully develops.

The starting of an HID lamp and also the associated sputtering of the electrodes affect the lamp life and the lumen maintenance. In order to minimize electrode sputtering during the glow and initial arc phase, balanced and controlled transitions are required, which are difficult to incorporate in the design of magnetic ballast.

Low frequency electronic ballast operates HID lamps with a frequency that is usually less than 300 Hz. The lamp operating waveform is an alternating square wave, which is typically created by a conventional full bridge inverter circuit. The square wave operation of the HID lamp yields: a) low lamp current crest factor, b) unity lamp power factor, and c) fast polarity transition, which results in higher efficiency, lower lamp voltage, and flicker free constant light output.

Low frequency electronic ballasts also primarily utilize two ignition schemes. These are: a) superimposing a breakdown voltage on top of the low frequency square wave (which is similar to the ignition scheme of magnetic ballasts) and b) high frequency resonant generated ignition pulses. As stated earlier, it is the quality of the ignition and transitions that primarily determine useful lamp life and light output. Therefore, low frequency electronic ballasts that utilize magnetic ballast ignition schemes provide certain improvements but not all that are desired. Low frequency electronic ballasts that utilize a controlled high frequency resonant scheme for lamp ignitions and then switch to a low frequency for normal operation can provide additional improvements.

However, none of the electronic ballasts provide a complete electronic ballast architecture that ensures proper lamp ignition and operation, since they typically address a limited number of aspects of lamp ignition and operation.

BRIEF SUMMARY OF THE INVENTION

The present electronic ballast for High Intensity Discharge (HID) lamps implements precise control of lamp ignition, lamp glow-to-arc currents, and the continued operation of HID lamps. The HID electronic ballast is based on fundamental HID lamp physics, and implements a complete electronic ballast architecture that ensures proper lamp ignition and operation.

The present HID electronic lamp ballast uses a "set of controls" that can be performed by controlling energy delivery by the "line side converter" to the "lamp side inverter". This set of controls comprises: 1) open circuit voltage control, 2) breakdown voltage amplitude control, 3) glow-to-arc transition current control, 4) "initial arc development" current control, 5) "arc stabilization" current control, 6) lamp power control, 7) lamp dimming, 8) "lamp rectification" current control, and 9) short circuit and lamp fault protections. One of the primary advantages of this "line side converter" energy delivery control method is that it doesn't need to vary the lamp operating frequency to achieve the above-noted controls.

The HID electronic lamp ballast also divides the arc development period into two sections, namely, 1) the "initial arc development" period, which begins as soon as the lamp enters into the arc phase and thereafter lasts a period of preferably not less than 1 second, and 2) the "arc stabilization" period, which follows the "intermediate arc development" period and continues until the lamp reaches a normal operating state.

Thus, the present HID electronic lamp ballast provides a complete electronic ballast architecture that ensures proper lamp ignition and operation since it is based on fundamental HID lamp physics and generally available lamp data.

DETAILED DESCRIPTION OF THE INVENTION

High Intensity Discharge (HID) lamps are primarily used for large area illuminations. Unlike an incandescent bulb, a ballast device is necessary to ignite and operate an HID lamp. There are three primary functions of a ballast device, namely: 1) lamp ignition, 2) lamp power control, and 3) control of AC line transients and power quality. HID lamps have negative resistance characteristics. Because of these physical characteristics, all gas discharge lamps are current controlled. However, even by maintaining a constant current in the lamp, lamp power cannot be controlled over the life of the lamp because the lamp voltage typically increases over the life of the lamp. Therefore, complex electronic ballast circuits are required for the proper ignition, control, and operation of HID lamps.

Basic Architecture of Electronic Ballast

Figure 7:
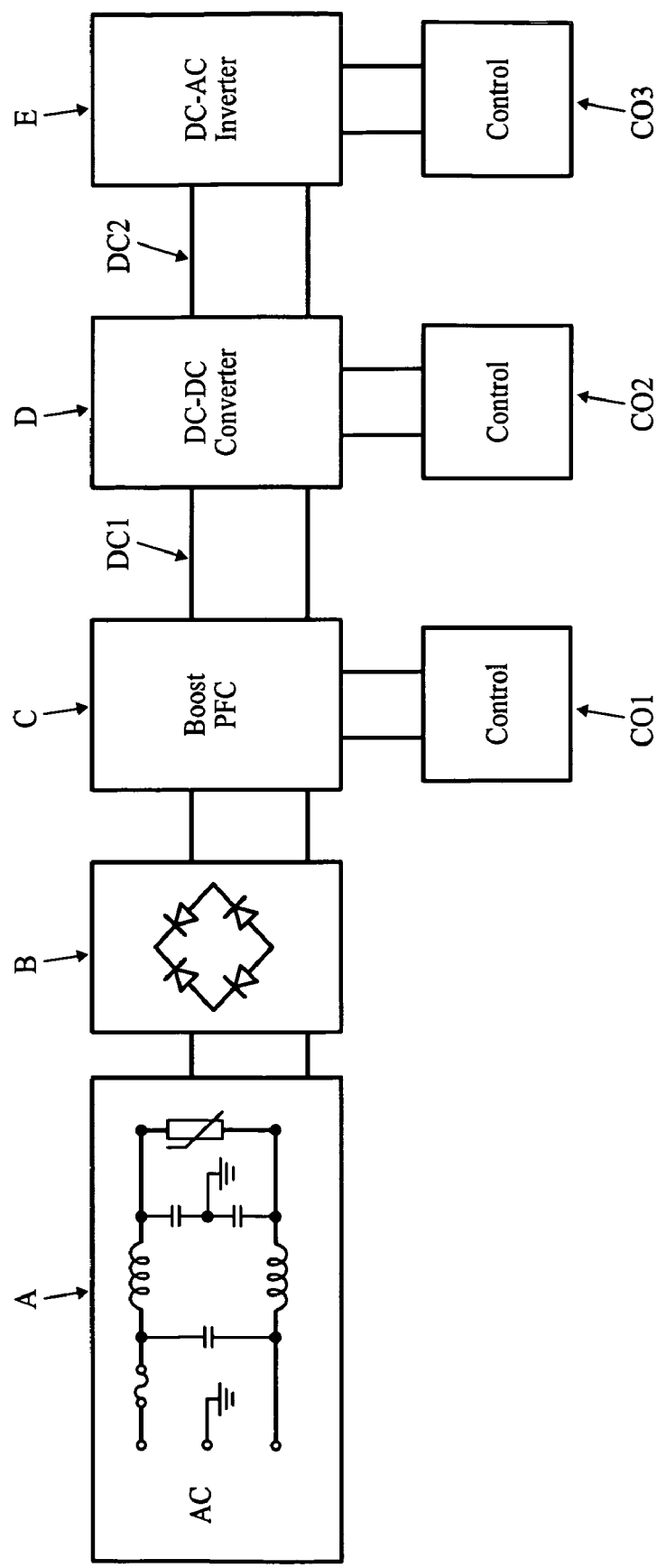
FIG. 7 illustrates, in block diagram form, the typical architecture of electronic ballast, which is powered by an AC source.
Figure 8:
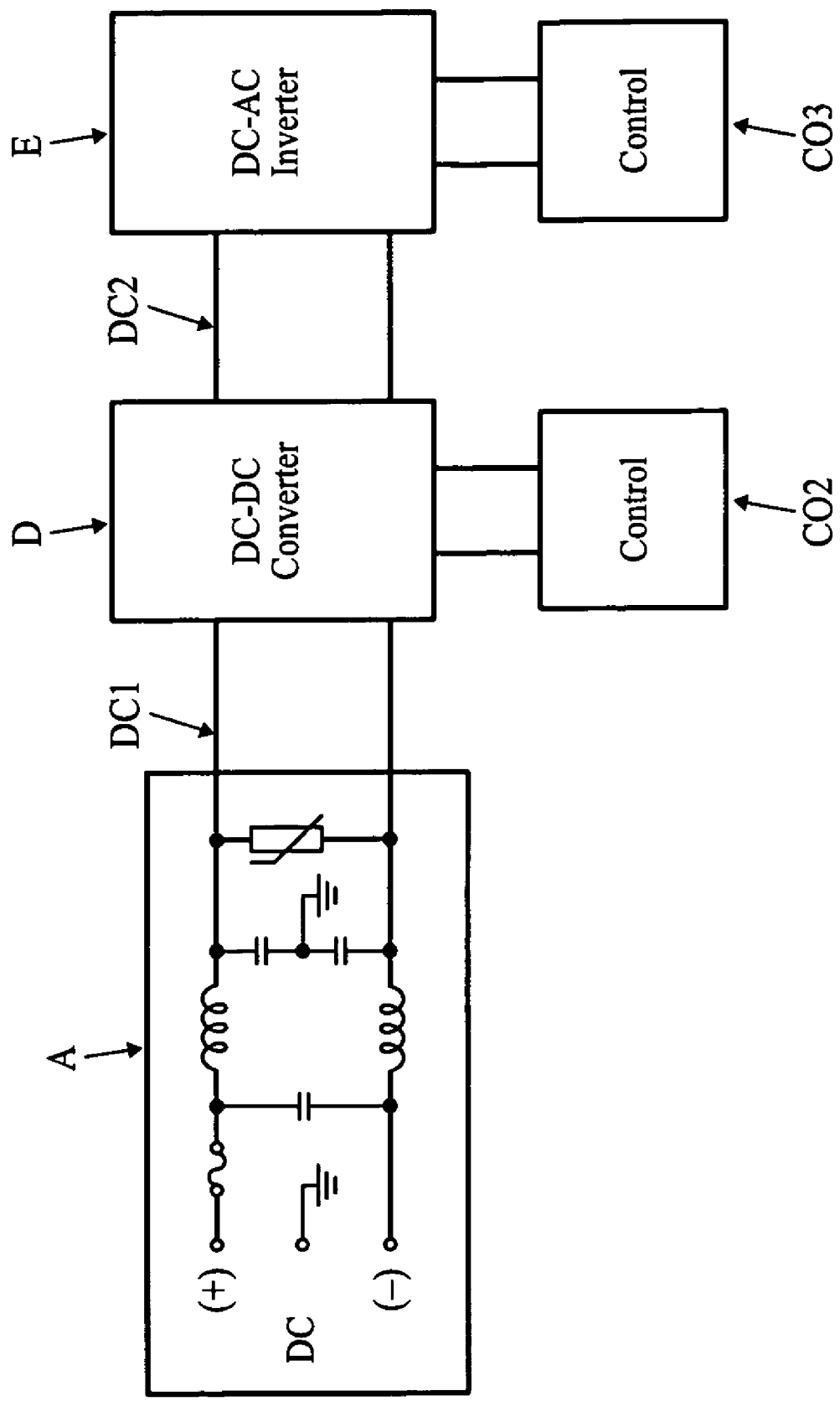
FIG. 8 illustrates, in block diagram form, the typical architecture of electronic ballast, which is powered by a DC source.

FIG. 7 illustrates, in block diagram form, the typical architecture of electronic ballast, which is powered by AC source, while FIG. 8 illustrates, in block diagram form, the typical architecture of electronic ballast, which is powered by a DC source.

In FIG. 7, element A of the electronic ballast receives alternating line power and incorporates conventional input power regulation circuit such as fusing, AC line transient protection, and EMI filters (DG12). The element A is termed the "AC front end" circuit. The element B of the electronic ballast is a conventional full bridge rectifier for rectifying the alternating line voltage into DC sinusoids. The element C of the electronic ballast is for power factor corrections and total harmonic distortion reductions (DG12) and employs, for example, a conventional boost type converter circuit. The element D of the electronic ballast is a DC-DC converter and employs, for example, a conventional buck type circuit. The voltage that appears at the input of element D is labeled DC1, and the DC voltage that appears at the input of element E is labeled DC2. The element E of the electronic ballast employs a DC-AC inverter circuit for creating ignition pulses and also for providing alternative power to an HID lamp during its normal operation. The control circuits CO1, CO2, and CO3 are the respective control circuits for element C, element D, and element E of the electronic ballast. Further, elements A, B, C, and D, and control circuits CO1 and CO2 combined are termed the "line side converter" herein. Further, element E and its control circuit CO3 combined are termed "lamp side inverter" herein. The architecture of FIG. 7 represents the generalized building blocks of a typical AC powered electronic ballast. The DC-AC inverter circuit of element E in FIG. 7 is commonly based on half or full bridge topology.

Basic Characteristics of High Intensity Discharge (HID) Lamps

The physics of the HID lamps are very complex. The primary focus of most existing electronic ballasts is to improve the electronic ballast circuit exclusively for cost savings. In addition, although major lamp manufacturers often emphasize lamp ballast optimizations, it is difficult to find a complete set of lamp physics data for a specific HID lamp. The HID lamp data that are generally available are: a) lamp type, b) lamp ignition voltage, c) lamp wattage, and d) lamp voltage. It is one of the goals of the present HID electronic lamp ballast to operate the HID lamp based on fundamental HID lamp physics and generally available lamp data.

Figure 2:
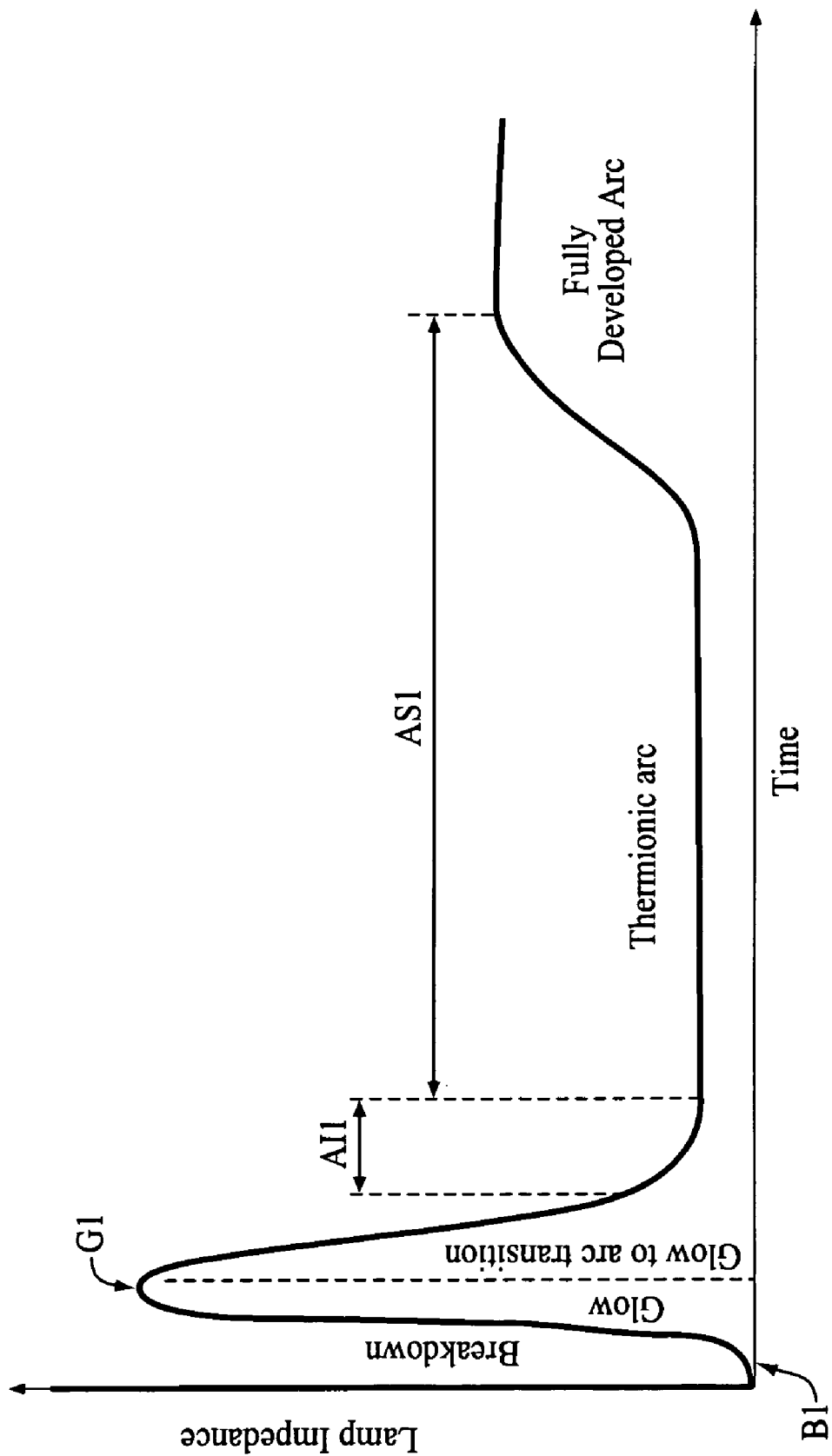
FIG. 2 illustrates the typical starting and operating impedance characteristics of an HID lamp.

The typical starting and operating impedance characteristics of an HID lamp are shown in FIG. 2. In order to better understand the present HID electronic lamp ballast, the starting sequence of an HID lamp in relation to these impedance characteristics is described herein.

HID lamps produce light by striking an electrical arc across metal electrodes housed inside a specially designed inner fused quartz or fused alumina tube. This tube is filled with both gas and metals, where the gas aids in the starting of the lamps. The metals then produce the light once they are heated to a point of evaporation, forming a plasma inside the tube. In all HID lamps, light is produced by passing a current through a metal vapor. Free electrons colliding with an atom in the metal vapor momentarily knock an electron into a higher orbit of the atom. When the displaced electron falls back to its former level, a quantum of radiation is emitted. The wavelength of radiation depends on the energy zone of the disturbed electron and on the type of metal vapor used in the arc tube. Although it produces 5% of its output when first ignited, the HID light requires a few seconds (usually 15-20) to come up to full output. Also, if power to the lamp is lost or turned off, the arc tube must cool to a given temperature before the arc can be re-struck and light produced. The ballast in an HID lighting system generally has two purposes. It provides the proper starting voltage to strike and maintain the arc, and it regulates the proper current to the lamp once the arc is established.

Ballasts are not often interchangeable among different types of HID lamps. A ballast design incorporates an electronic circuit to provide specific lamp/ballast operating characteristics. As an example, the effects of line voltage variations on resultant changes of lamp wattage are a function of the ballast circuit design. Requirements for a circuit which provides a finer degree of lamp regulation generally result in a higher ballast cost.

High Intensity Discharge (HID) Lamp Breakdown on Ignition

At the instant of the lamp breakdown, the lamp impedance can be less than 1 ohm for a very short period of time, as indicated by point B1 in FIG. 2. This low lamp impedance creates almost a short circuit condition; therefore, an electronic ballast control circuit must limit current into the HID lamp. Following the lamp breakdown, the impedance almost immediately goes back to a much higher value, causing the lamp voltage to rise, as indicated by point G1 in FIG. 2. It is desirable to produce control voltages that result in a short glow state duration, a low glow state current, as well as a high glow state lamp voltage in order to minimize electrode sputtering. Following the glow period, the lamp enters into the arc development phase.

Although a controlled glow-to-arc transition reduces electrode sputtering, this gets further complicated when a low frequency HID electronic ballast employs high frequency ignition pulses for the lamp breakdown, which switches to the low operating frequency following the lamp ignition. This switching often creates additional problems, such as extinction and excessive and asymmetrical current draw. In order to overcome these problems, the present HID electronic lamp ballast divides the arc development period into two sections, namely, 1) the "initial arc development" period, which begins as soon as the lamp enters into the arc phase and thereafter lasts a period of preferably not less than 1 second, as indicated by point AI1 in FIG. 2, and 2) the "arc stabilization" period, which follows the "intermediate arc development" period and continues until the lamp reaches a normal operating state as indicated by point AS1 in FIG. 2.

It must also be noted that the impedance characteristics, as illustrated in FIG. 2, is a generalized behavior of an HID lamp. The actual values are not only time dependent but can also change depending on many variables such as the cold lamp start vs. hot re-ignition, lamp-to-lamp variations, and lamp aging.

Design Criteria for a Low Frequency Electronic High Intensity Discharge (HID) Ballast The primary goal of the present HID electronic lamp ballast is to implement a complete architecture for low frequency electronic HID ballast. Accordingly, the first aspect of this HID electronic lamp ballast uses a "design guide" consisting of twelve distinct design criteria (DG), comprising:

DG1: Open Circuit Voltage: The ballast shall supply an open circuit voltage of at least 280V to an HID lamp. This open circuit voltage is necessary for generating required breakdown pulses; also upon breakdown and before the lamp enters into an arc state, the high open circuit voltage creates a favorable condition for glow to arc transition.

DG2: Breakdown Voltage: The ballast provides periodic high frequency breakdown voltage pulses to an HID lamp in a manner that causes the lamp to breakdown at a lower voltage, which reduces sputtering of cathode materials.

DG3: Breakdown Voltage Limit: The ballast limits the magnitude of the breakdown voltage. Unless hot re-ignition is required, the breakdown voltage shall not be more than 3,500V.

DG4: Glow-To-Arc Transition: The ballast minimizes the transition time and the lamp current flow during the glow-to-arc phase transition. Prior to entering into the arc phase, the lamp impedance remains high. A prolonged glow state duration and uncontrolled current into the lamp increases electrode sputtering.

DG5: "Initial Arc Development" Current: As the HID lamp enters into the beginning phase of the arc, the ballast provides a controlled current into the lamp for a period of preferably no less than one second. The controlled current is higher than the glow-to-arc state current but lower than the "arc stabilization" current. These thresholds minimize cathode sputtering, while also preparing the lamp for a smooth transition to the low operating frequency. A smooth transition herein is defined as a transition that prevents lamp extinction and excessive and asymmetrical current drawn.

DG6: High Frequency To Low Frequency Transition: Prior to switching to the low operating frequency, the ballast increases the arc current to a level that is higher than the "initial arc development" current but not more than two times the normal operating current. This ensures a smooth transition from a high operating frequency to the low operating frequency.

DG7: "Arc Stabilization" Current: As the lamp switches to the low operating frequency, the ballast limits the "arc stabilization" current not to exceed twice the lamp normal operating current.

DG8: "Lamp Rectification": The ballast incorporates a circuit that avoids or limits asymmetrical current drawn in an HID lamp. During the transition from high frequency to low frequency, during the "arc stabilization period", as well as during the normal lamp operation, the lamp may enter into a state which is commonly known as "lamp rectification" state. Prolonged lamp operation in a rectification state may cause both ballast failures and lamp ruptures.

DG9: Lamp Power Control: Following the "arc stabilization" period, the ballast maintains a specified power into an HID lamp during the normal operation. The operating impedances of HID lamps, in particular high-pressure sodium lamps, change substantially over their lives. Therefore, an electronic ballast must incorporate a power control circuit for maintaining the specified lamp wattage.

DG10: Fast Polarity Transition: The ballast operates an HID lamp such that during the normal operating state, the AC square wave switches its polarity very quickly. The combination of the square wave operation of an HID lamp and the very fast transition from positive to negative voltage polarities not only ensures low lamp current crest factor, unity lamp power factor, minimum operating voltage and current overshoot, and substantially constant light output, but also increases lamp life and efficiency.

DG11: Short Circuit And Lamp Fault Protection: The ballast withstands output short circuit conditions and protects against abnormal lamp operations.

DG12: AC Line Power Quality Maintenance: The ballast draws power from an AC line in a manner to limit turn-on inrush current, provide transient protections, limit electromagnetic interference, provide high power factor, and reduce total harmonic distortions.

While a few of the above design criteria are known, in order to combine the lamp physics characteristics with efficient power conversion, all twelve of the design criteria need to be incorporated in an HID electronic ballast circuit.

Electronic Ballast Circuits

Figure 9A:
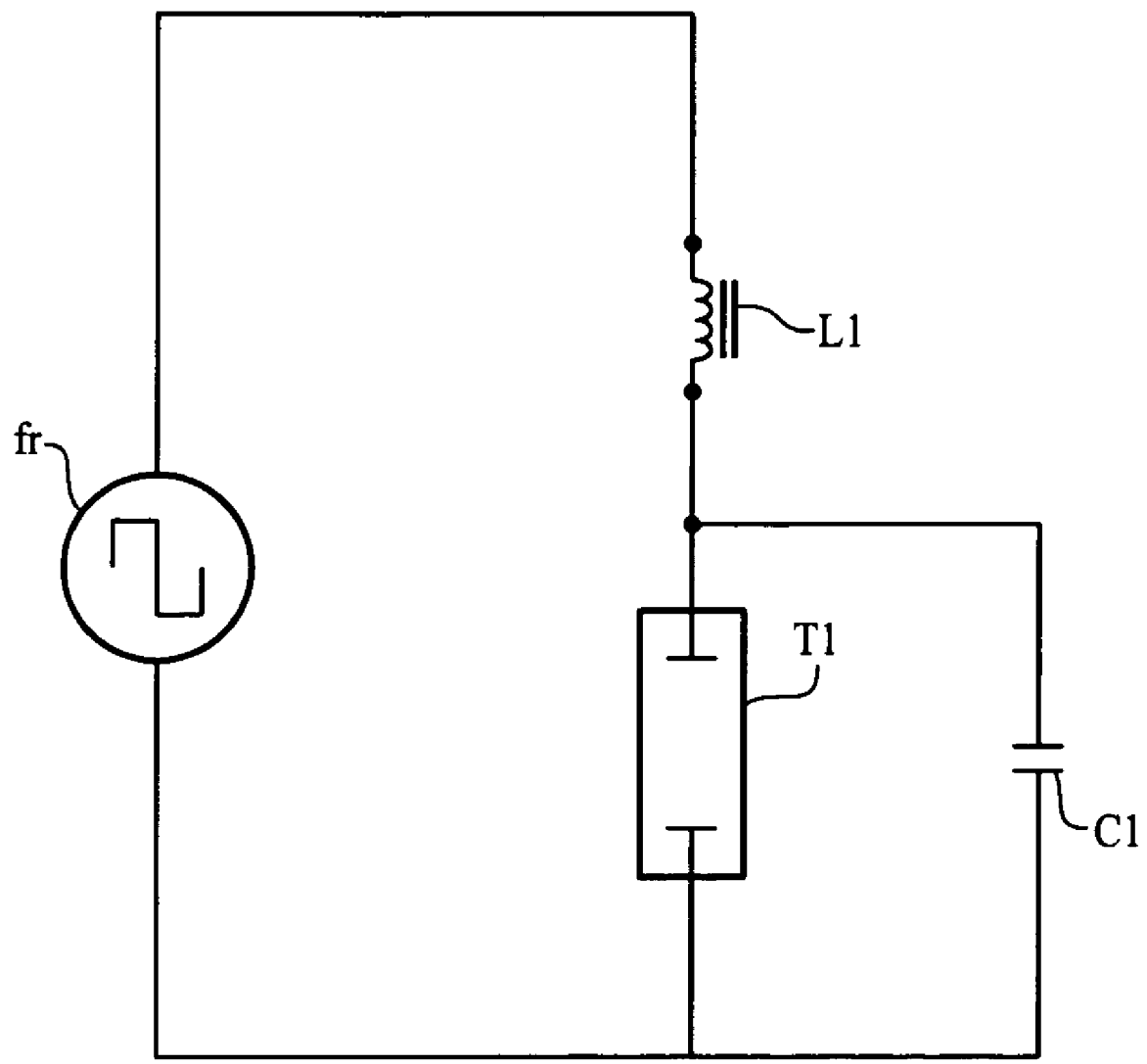
FIG. 9A illustrates a lamp inverter circuit that is based on conventional half bridge topology.
Figure 9B:
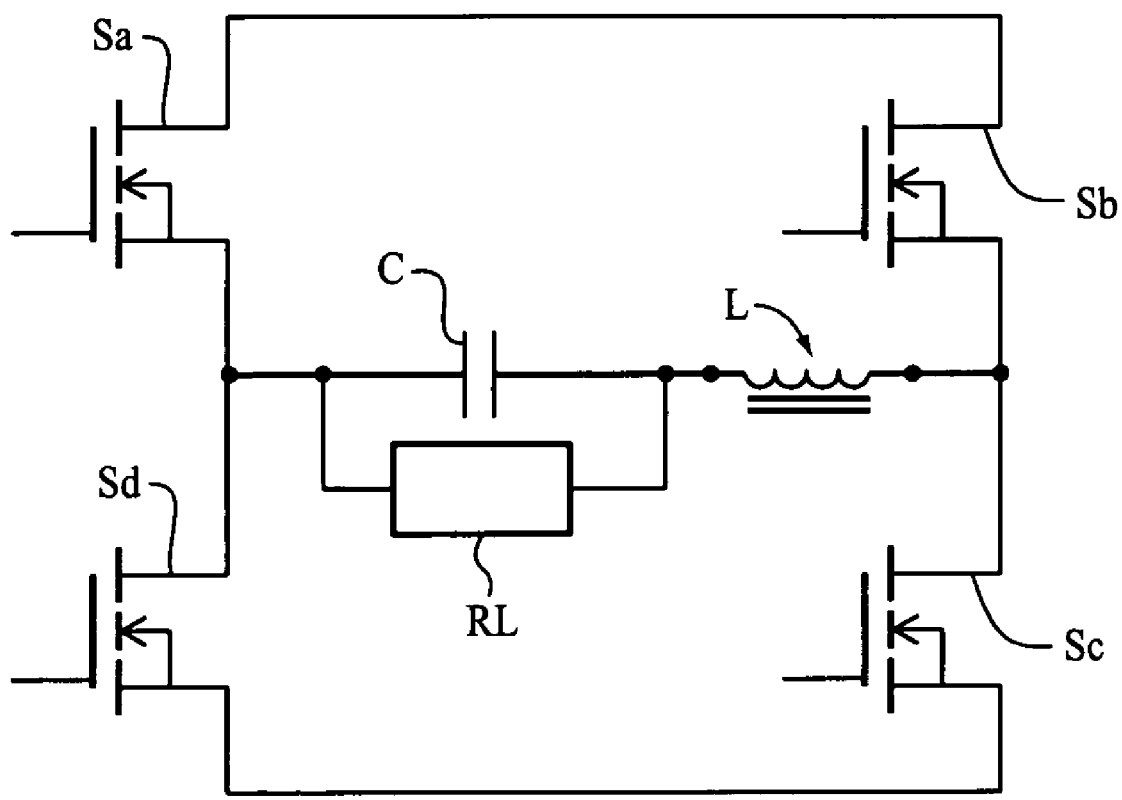
FIG. 9B illustrates a lamp inverter circuit that is based upon conventional full bridge topology.
Figure 9C:
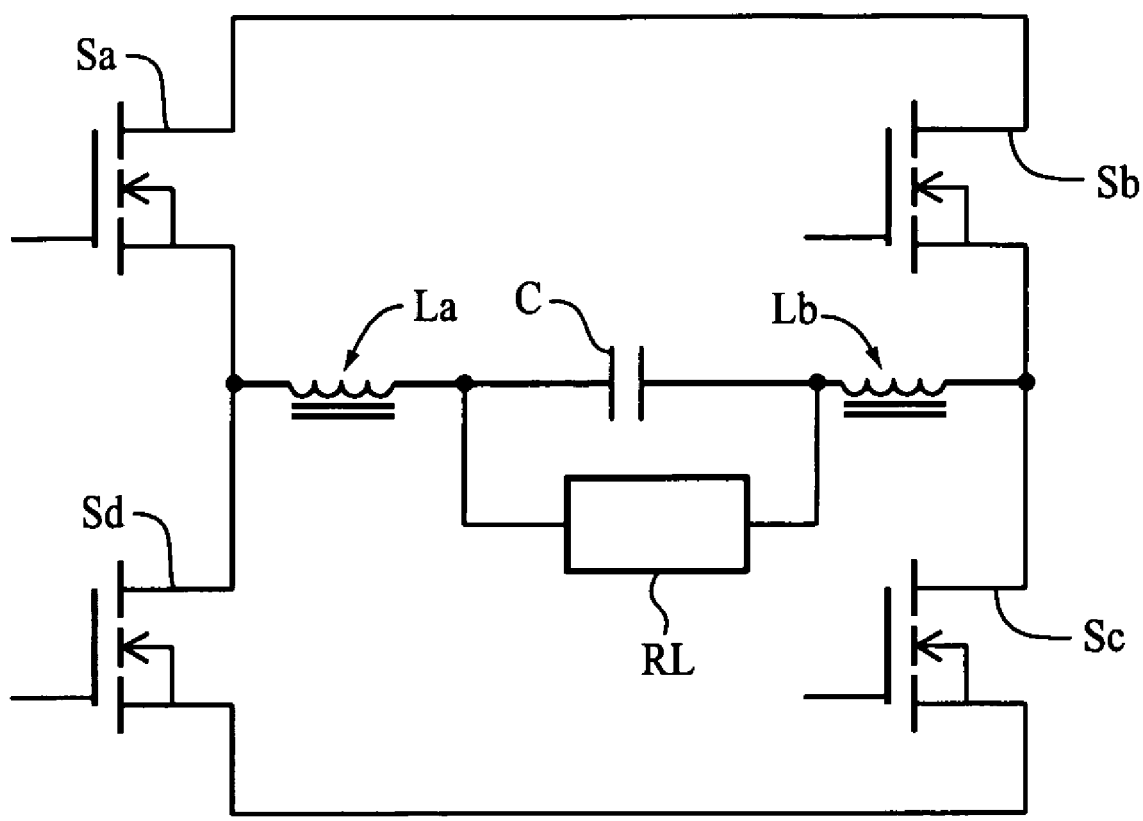
FIG. 9C is a variation of FIG. 9B which illustrates the use of a split inductor in this lamp inverter circuit.

FIG. 9A is a typical lamp inverter circuit that is based on conventional full bridge topology. The circuit elements Sa, Sb, Sc, and Sd are power switches, and L is an inductor, which is connected in series with a capacitor C. The load is an HID lamp RL, which is connected across capacitor C. FIG. 9B is a variation of FIG. 9A whereby the inductor L of FIG. 9A is split into two inductors La and Lb. The series combination of the inductor L and the capacitor C creates the lamp breakdown voltage by changing the operating frequency of the full bridge inverter to the natural series resonant frequency of inductor L and capacitor C. The values of inductor L and capacitor C are usually kept low in order to minimize the circulating current into the resonant tank. Further, the lower the value of capacitor C, the lower the capacitive effects during the normal operation of the lamp.

Figure 10A:
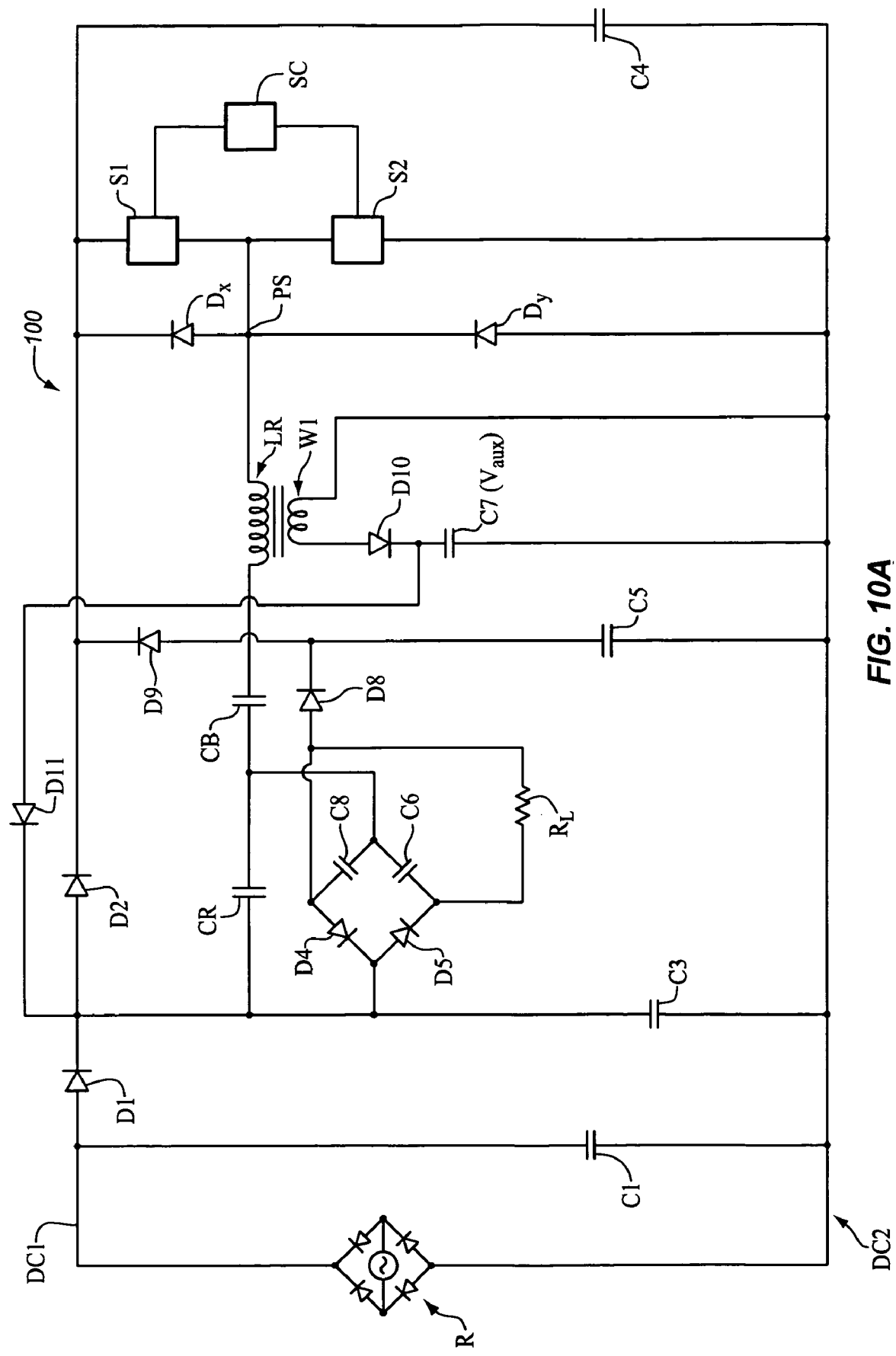
FIG. 10A illustrates a single stage power converter.

There are various ways the "design guide" implementations can be realized in an electronic ballast. However, a few design criteria such as AC inrush current limiting (DG12), short circuit, and lamp fault protections (DG11 and DG12) may be inherent to certain power conversion topologies. These inherent properties simplify the implementation of the "design guide" in an electronic ballast. US Published Patent Application No. 2007/0217235 combines the element C and the element D of FIG. 7 into one element whereby the power factor corrections (DG12) and DC-DC conversions are accomplished in a single stage. An illustration of such a single stage power converter is shown in FIG. 10A, which corresponds to the FIG. 7 of the US Published Patent Application No. 2007/0217235. The primary advantages of a single stage power conversion are: 1) high power conversion efficiency, 2) less number of components, 3) inherent turn-on AC inrush limit, 4) low stress short circuit, and 5) lamp fault protections. The additional benefits of single stage power conversion are further evident in the following description.

In FIG. 10A, the rectifiers R rectify the AC power. Capacitor C1 is a small high frequency filter capacitor. It is well known that during power conversions high frequency noise is generated by power component switching actions within the device. The purpose of diode D1 is to prevent high frequency switching related circuit noise from conducting back to the AC line. The pair of power switches S1 and S2 is connected across the input lines and switch alternately. The switching speed and on and off time periods are usually controlled by an integrated control circuit SC. The capacitor C4 is a large smoothing electrolytic capacitor. The diodes Dx and Dy are commutating diodes. The resistor RS1 is a current sense resistor. When an inductor LR and the capacitor CR are placed as shown in FIG. 10A, and when the switching frequency f is such that $f=1/2\pi\sqrt{(LR \times CR)}$, they form a resonant tank circuit. The diodes D4, D5, D6, and D7 are a full bridge high frequency rectifier that provides additional DC power to the load RL. The capacitor C6 is a high frequency filter capacitor for the output load. The value of this high frequency filter capacitor C6 may be as low as 1 uF for a 250 W High Pressure Sodium (HPS) lamp ballast inverter, for example. The capacitor C5 is also a small capacitor such as 0.1 uF. On the other hand, depending on the magnitude of the output load, the value of the smoothing capacitor C4 may be greater than 100 uF. Capacitor CB is a DC blocking capacitor. Resistor RS1 is a current sensing resistor.

Assuming the value of capacitor C5 is 1 uF, and because it is connected in series with smoothing capacitor C4, a much larger value capacitor whose value may be higher than 100 uF, the effective series capacitance of capacitors C4 and C5 is less than 1 uF. Therefore, immediately following the application of the input AC power to the circuit of FIG. 10A, the charging current that flows from the AC line into the smoothing capacitor C4 is lower, and its duration is significantly shorter simply because the input AC power source sees a much smaller capacitor as opposed to a much larger value smoothing capacitor C4. Therefore, the control circuit maintains the AC inrush current of short duration, and low magnitude at turn on is due to the fact that the input AC power source sees a small capacitor.

Auxiliary High Frequency AC Voltage Source

Further, the resonant inductor LR has a secondary winding W1. The voltage that is generated across winding W1 is high frequency AC. A voltage of magnitude of 1:5 with respect to the input AC line voltage peak value is sufficient. The high frequency AC voltage across winding W1 is rectified by a diode D11 to produce an auxiliary source of DC power for the load RL. This rectified DC voltage Vaux is smoothed out by a smoothing capacitor C7 and then fed back at the junction of diodes D1 and D2. Further, the rectified voltage Vaux also can be obtained by a full bridge rectifier arrangement, or this voltage can be fed at the junction of diodes D4 and D5. It must be understood that within the power conversion device this auxiliary DC power source also can be created by other means such as use of a low power conventional buck converter. However, creating this power source from the winding W1 is certainly straightforward and cheaper. The auxiliary high frequency AC voltage source is used to produce the auxiliary DC power Vaux which is used in the present improved single stage power converter for the reduction of output ripples. It must be noted that the output ripples also can be reduced by controlling the operating frequency of the "line side converter" at or near the 50/60 Hz AC zero-crosses.

The reduction of output ripples by the use of the auxiliary DC supply Vaux is explained as follows. Near the zero crossings of the input line AC voltage, the rectified DC sinusoids produced by rectifier R approach zero potential and cannot provide the required energy to the load RL. As a result, the resonant inductor LR, near the zero crossing of the input line AC voltage, tries to extract energy out of a very low voltage source, which causes certain overshoots. Therefore, the voltage that develops across the resonant capacitor CR also experiences certain overshoots. These overshoots inject a power ripple into the load RL at the rate of 120 Hz for 60 Hz AC input and at the rate of 100 Hz for 50 Hz AC input. Therefore, the DC power source Vaux, when connected as shown in FIG. 10A, acts as a secondary power source near zero crossings of the input line AC voltage.

In operation, the capacitor C7 gets fully charged rapidly near the peak of the DC sinusoids and delivers power to the load RL when the rectified DC sinusoid voltage drops below the value of Vaux. The benefits of this auxiliary DC power source are substantial. First, in AC applications when a load RL is connected directly across the resonant capacitor CR and powered by high frequency, the voltage ripples near zero crossings are substantially reduced. This eliminates power variation and flickering into the load RL near zero crossings of the input line AC voltage. Second, in DC applications, due to reduced ripples, the value of the output filter capacitor C6 can be substantially smaller. Therefore, in many applications, film capacitors may be used. Good quality film capacitors have longer life and much lower loss compared to electrolytic capacitors. Therefore, this increases device reliability and power conversion efficiency. Further, the use of a low value filter capacitor results in a faster response time for output load regulation. Third, when power switches S1 and S2 switch near zero crossings of the AC voltage present on the input lines, the power switches S1 and S2 experience additional switching noise. The application of Vaux not only reduces the switching noise but also improves overall Power Factor and Total Harmonic Distortion. Further, the application of Vaux also adds the overall output power delivery capacity by 4% to 5%.

Inrush Current Flow Limitation

During the normal operation, when switch S2 closes, energy flows into switch S2 through resonant inductor LR, capacitor CB, as well as diode D1 and resonant capacitor CR, through diode D4, load RL, and diode D6. However, as energy flows, primarily the load current that flows through diode D1, load RL, and diode D5 reaches the junction of the diodes D6 and D8, part of this energy also flows into smoothing capacitor C5 and thereby charges the smoothing capacitor C5. The voltage that is generated between the capacitors CR and CB with respect to circuit ground (lead DC2) is high frequency AC. Therefore, the diodes D4, D5, D6, and D7 act as a bridge rectifier. The DC voltage that appears across the junctions D4-D5 is plus and D7-D6 is minus.

The charging current into smoothing capacitor C5 primarily depends on the impedance of the load RL, since the lower the impedance the higher the charging current. During a no load situation, the current flow into smoothing capacitor C5 reduces almost to zero. The diode D8 prevents charging smoothing capacitor C5 directly from the AC line; however, once smoothing capacitor C5 is fully charged, it acts as a smoothing capacitor.

Circuit Characteristics of the Improved Single Stage Power Converter

Because it is evident to anyone skilled in the art, the following are stated in reference to FIG. 10A:
1. For a power conversion device that requires delivering low power to the output load, one or all of the diodes D3, D4, and D7 can be eliminated.
2. High frequency bypass capacitors as snubber or for energy transfer optimization may be added across any or each of the diodes D1 through D8, including one or more diodes may be replaced by the capacitors.
3. The power switches S1 and S2 are part of a half bridge resonant inverter. A conventional full bridge resonant inverter can also be constructed and used for the delivery of higher output power. Further, a transformer in these inverters also can be added for output load isolation.
4. Non-resonant and quasi-resonant circuits based on other topologies such as fly back topology may also be used.
5. The output power into the load can be regulated by such conventional techniques as Pulse Width Modulation (PWM or by frequency modulation. Therefore, actual operating frequency may be different than resonant frequency.
6. The diode D1 may be replaced by an inductor; however, the cost of an inductor is much more than a diode.
7. The resonant inductor LR and the resonant capacitor CR connections in FIG. 10A may also be connected and rearranged in various manners. Each of these alternatives may appear substantially different than the circuit arrangement of FIG. 10A. However, circuit analysis shows that various arrangements within the topology under the present improved single stage power converter yields the same circuit functions either at the expense of additional components or power conversion efficiency.

Full Bridge Inverter Circuit

Figure 10B:
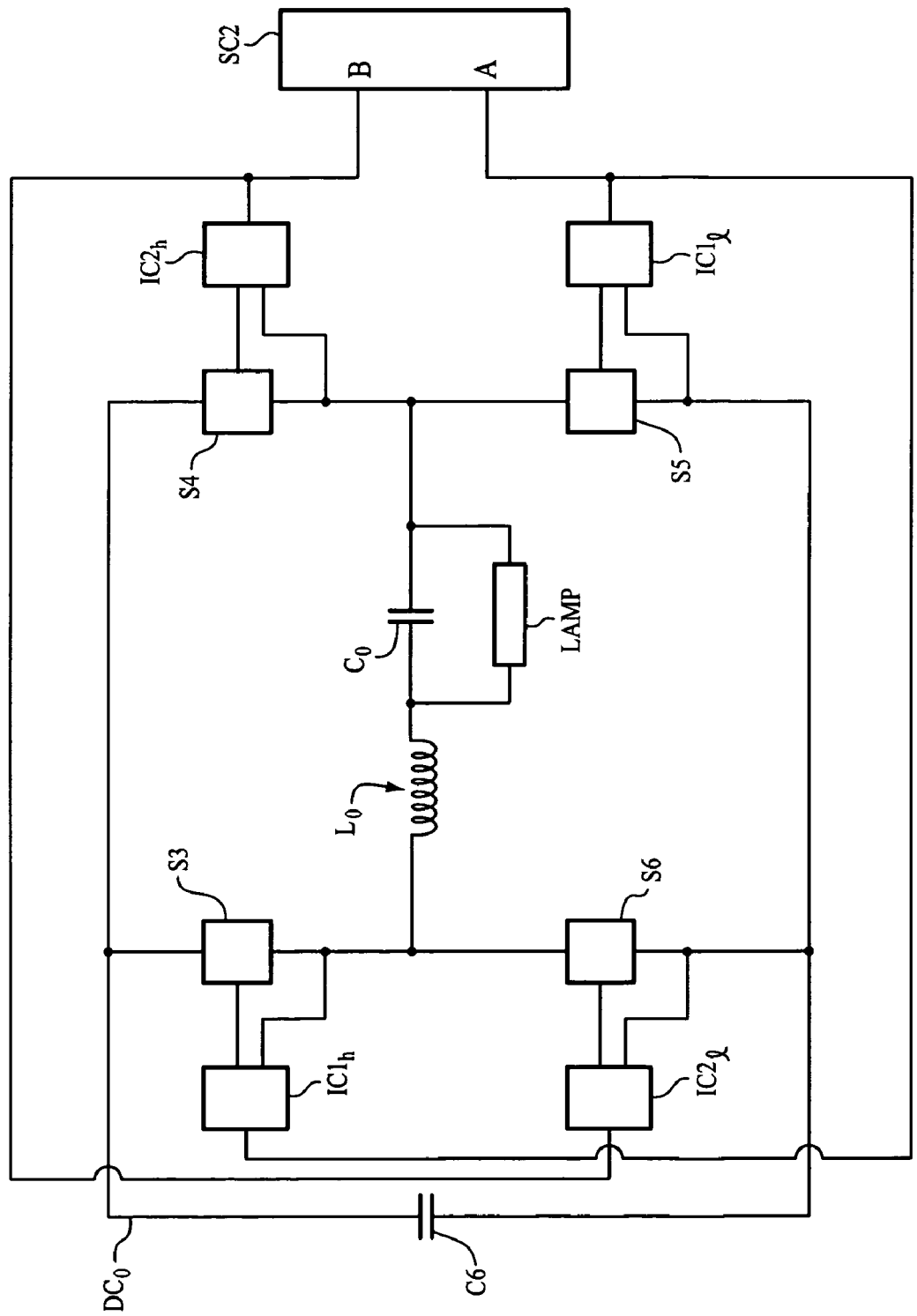
FIG. 10B illustrates a more detailed version of the full bridge inverter circuit of FIG. 9B.

FIG. 10B, which corresponds to the FIG. 20 of the US Published Patent Application No. 2007/0217235, is a more detailed version of the full bridge inverter circuit of FIG. 9B. The switches S3 and S5 form one pair, and the switches S4 and S6 form the other pair of a full bridge inverter. It is important to note that the low frequency excited HID ballast operating frequency range usually lies between 50 Hz and 300 Hz. The switching control circuit SC2 is a conventional switched mode IC and generates alternate low frequency drive signals at the output terminals A and B. There are other known techniques to provide low frequency drive signals, but one convenient way to provide low frequency drive signals to respective switch pairs of a full bridge inverter is by means of a commercially available high and low side driver IC. The first device, IC1, is responsive to the drive signal that arrives at the terminal A and drives the switch pair S3 and S5. In FIG. 10B, IC1$l$ signifies the low-side drive section of IC1, and IC1$h$ signifies the high-side drive section of IC1. Further, the second device, IC2, is responsive to the drive signal that arrives at the terminal B and drives the other switch pair S4 and S6. In FIG. 20, IC2$l$ signifies the low-side drive section of IC2, and IC2$h$ signifies the high-side drive section of IC2.

Further, the switches S3, S4, S5, and S6 may be bipolar, IGBT, or power MOSFET types of devices. However, the preferred choice is power MOSFET devices. This is because of the following advantages: a) during the normal operation, the operating frequency is low; therefore, the body diodes of the MOSFET devices can be used as the full bridge commutating diodes; b) low on resistance MOSFET devices yield higher power conversion efficiency; and c) during ignition period, the operating frequency is much higher. MOSFET devices are also easier to turn on and turn off at higher frequency.

Further, the purpose of the inductor Lo and the capacitor Co are explained as follows. HID lamps, and in particular HPS lamps, require in excess of 3000V for ignition. Therefore, at the beginning, the switching control circuit SC2 can be programmed to operate at a sweeping frequency with periodic intervals for generating high voltage ignition pulses by resonant and harmonic resonant means.

Electronic Ballast Using a Single Stage "Line Side Converter" Topology

Figure 10C:
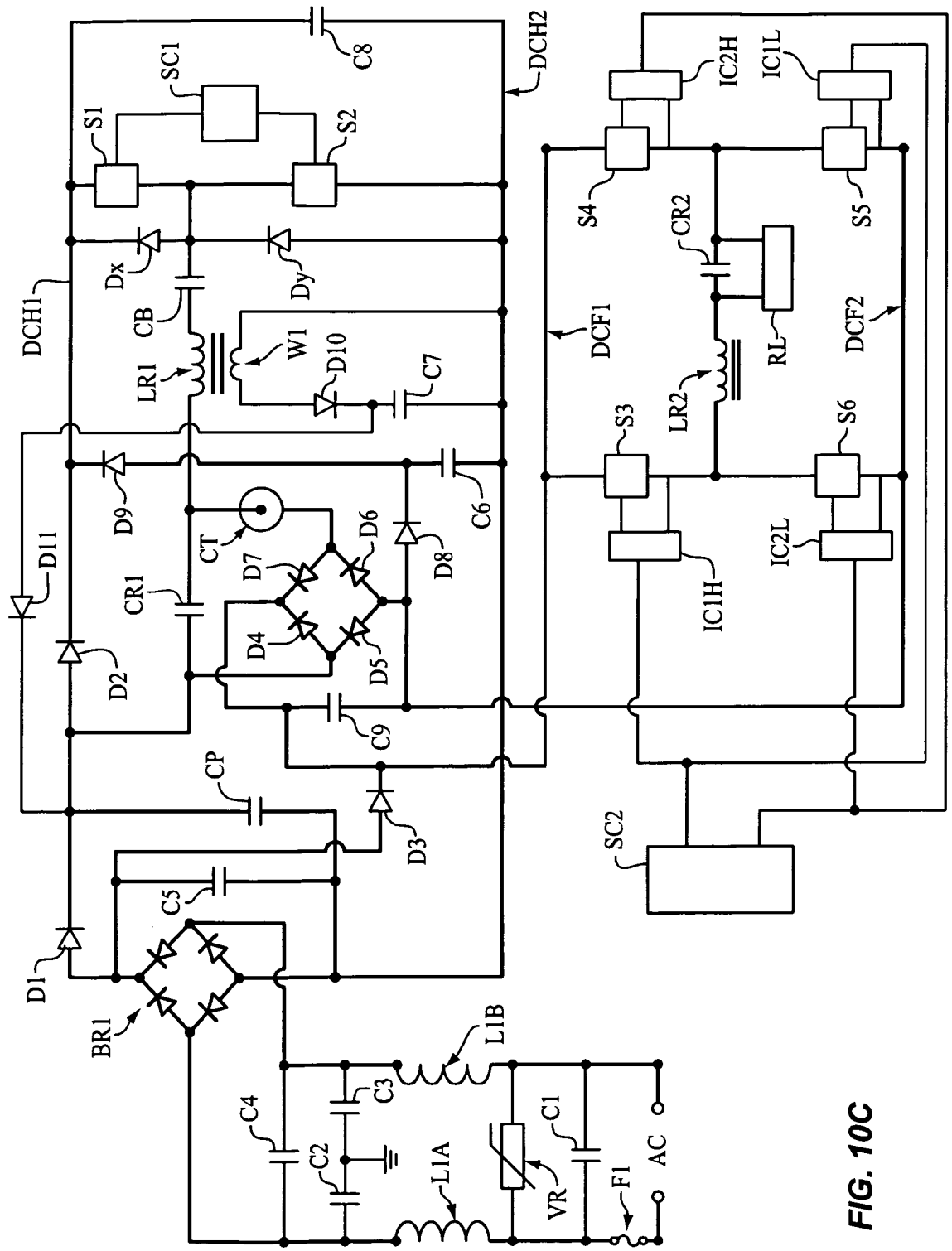
FIG. 10C illustrates an electronic ballast that is based on a single stage "line side converter" topology.

Further, FIG. 10C is a combination of the "AC front end" circuit of FIG. 7, the circuit of FIG. 10A, and the circuit of FIG. 10B; together they constitute an electronic ballast that are based on a single stage "line side converter" topology. The circuit of FIG. 10C performs the following primary functions: a) inherently limits turn-on AC inrush (DG12), b) provides power factor corrections (DG12) and DC-DC conversion in a single stage, c) generates a controlled high frequency breakdown voltage (DG2 and DG3), and d) operates an HID lamp with low frequency square wave.

A brief explanation of the circuit and functions of the various circuit components in FIG. 10C are as follows. The fuse Ft, the inductors L1A and L1B, the metal oxide varistor VR, the capacitors C1, C, C3, and C4 together form an "AC front end" circuit. The power switches S1 and S2, the resonant inductor LR1, the DC blocking capacitor CB, resonant capacitor CR1, and the power factor correction capacitor CP are all part of a half bridge resonant circuit. The half bridge control circuit SC1 consists of various circuits including a switch mode IC for generating drive signals for the power switches S1 and S2. The high side switch S1 drives are isolated by such devices as pulse transformers or level shifting devices. BR1 is a full bridge AC line rectifier. The diodes D1, D2, and D3 are for channeling rectified AC sinusoids and resonant energy. The diodes D4, D5, D6, and D7 are part of a full bridge rectifier for rectifying high frequency voltage and current that appears across the resonant capacitor CR. The capacitor C9 filters high frequency contents. The diode D8 provides high frequency charging current to the storage capacitor C6. The diode D9 has two functions, namely, delivers energy from C6 to the switch S1 and also prevents charging C6 by the rectified AC sinusoids, thereby limiting AC inrush. DCH1 is the positive DC bus voltage that is fed to the half bridge inverter. DCH2 is the negative side of the DC bus voltage and commonly termed as the power ground. The diode D10 rectifies voltage that appears across the secondary winding W1 and stores energy into the capacitor C7. The diode D11 channels this energy into the junction of the diodes D1 and D2 for the purpose of minimizing switching transients at the AC zero crossings. The capacitors C5 and C8 are small value capacitors for bypassing high frequency switching contents.

The voltage that appears across the capacitor C9 is fed to the full bridge inverter of the power switches S3, S4, S5, and S6, where DCF1 is the positive polarity and DCF2 is the negative polarity of this voltage. The control circuit SC2 consists of various circuits including a switch mode IC that generates drive signals for the full bridge power switches. IC1H and IC2H are isolated high side drivers. IC1L and IC2L are low side drivers. Alternatively, the switch mode IC and these four discrete drivers can be replaced by a single self-oscillating full bridge driver IC. The inductor LR2 and the capacitor CR2 form a resonant tank circuit for the purpose of generating the breakdown voltage. The load RL is an HID lamp.

Figure 6:
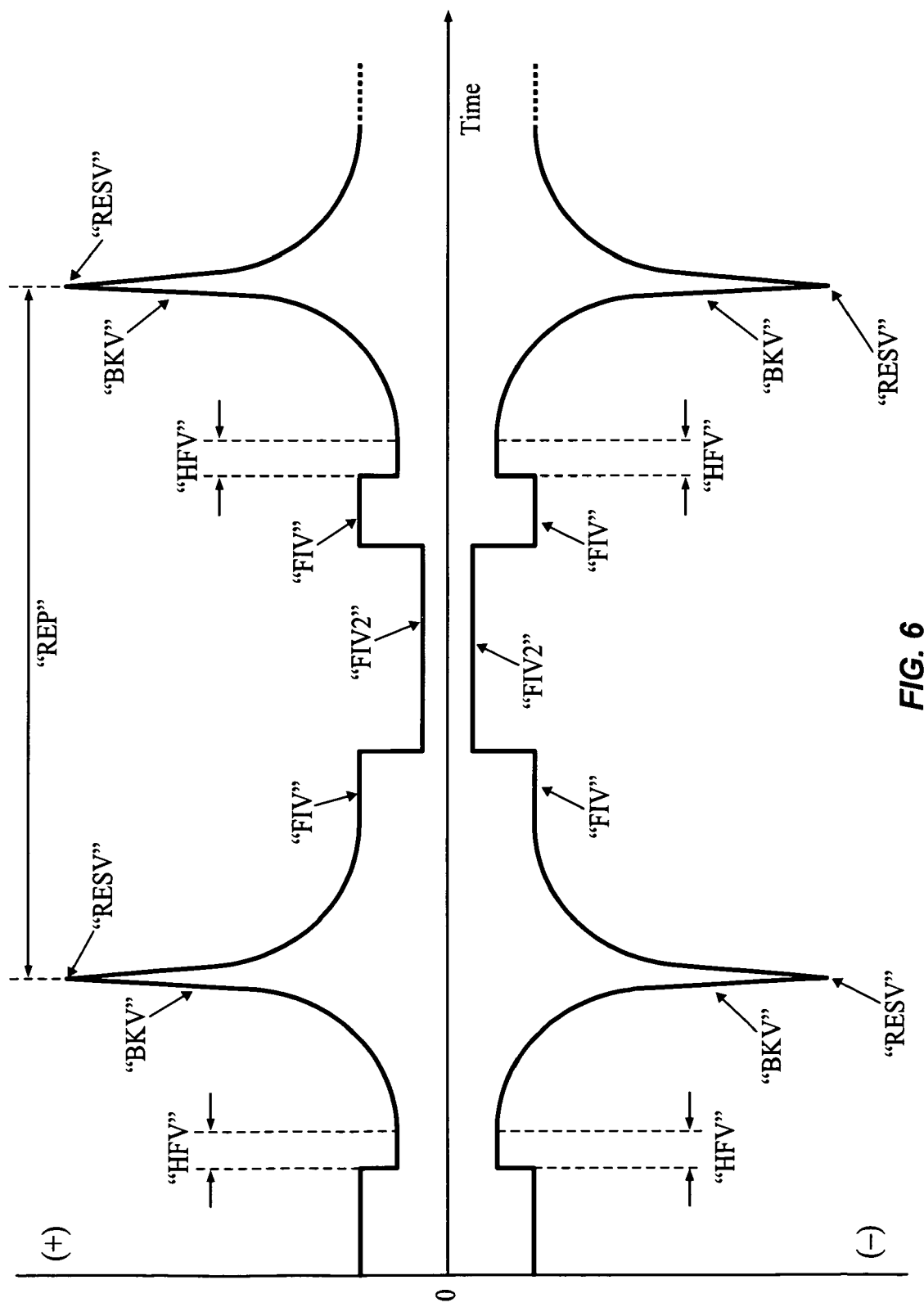
FIG. 6 illustrates a graph of the ignition voltage profile of an HID lamp.

The lamp power control (DG9) may be accomplished by means of sensing the lamp current and the DC bus voltage DCF1. There are many ways the lamp current can be sensed, but a high frequency current transformer means is straightforward and less sensitive to circuit noise. In FIG. 6C, a current transformer CT is placed in the input of the high frequency bridge rectifier diodes D4, D5, D6, and D7. Further, the filter capacitor C9 is a low value capacitor, usually 1 microfarad. Due to its low value, this filter capacitor does not interfere with the lamp current detections by high frequency means. It must be noted that the high frequency current that powers the lamp drive circuit in FIG. 6C is bi-directional, whereas, a "line side converter" that is based on a boost-buck topology delivers a high frequency current in only one direction, which makes lamp current sensing by a current transformer very difficult. Although the lamp current can be sensed by placing a current transformer in one of the legs of the lamp, this requires a current transformer that can sense low frequency current during the normal operation. A low frequency current transformer is expensive and, depending on the response characteristics, may not sense properly the high frequency current during the glow-to-arc period.

Further, a scaled sum of the lamp voltage DCF1 and the lamp current may be applied to a comparator for controlling the lamp power by varying either the duty cycle or operating frequency of the "line side converter" of FIG. 10C. A detailed discussion on this subject can be found in U.S. Pat. No. 7,199,528.

Figure 1:
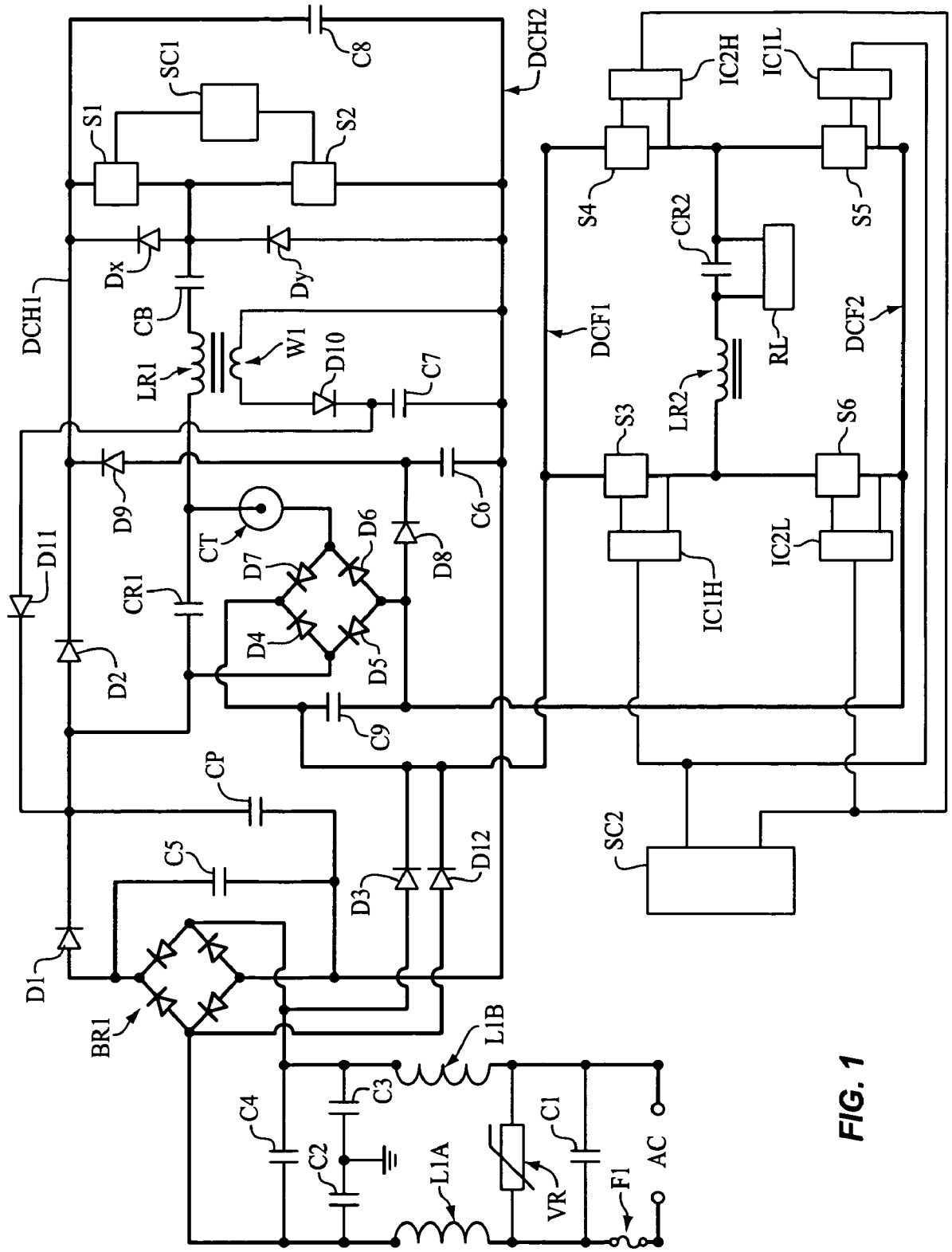
FIG. 1 illustrates an embodiment of the present electronic ballast for High Intensity Discharge (HID) lamps which implements precise control of lamp ignition, lamp glow-to-arc currents, and operation of HID lamps.
Figure 11A:
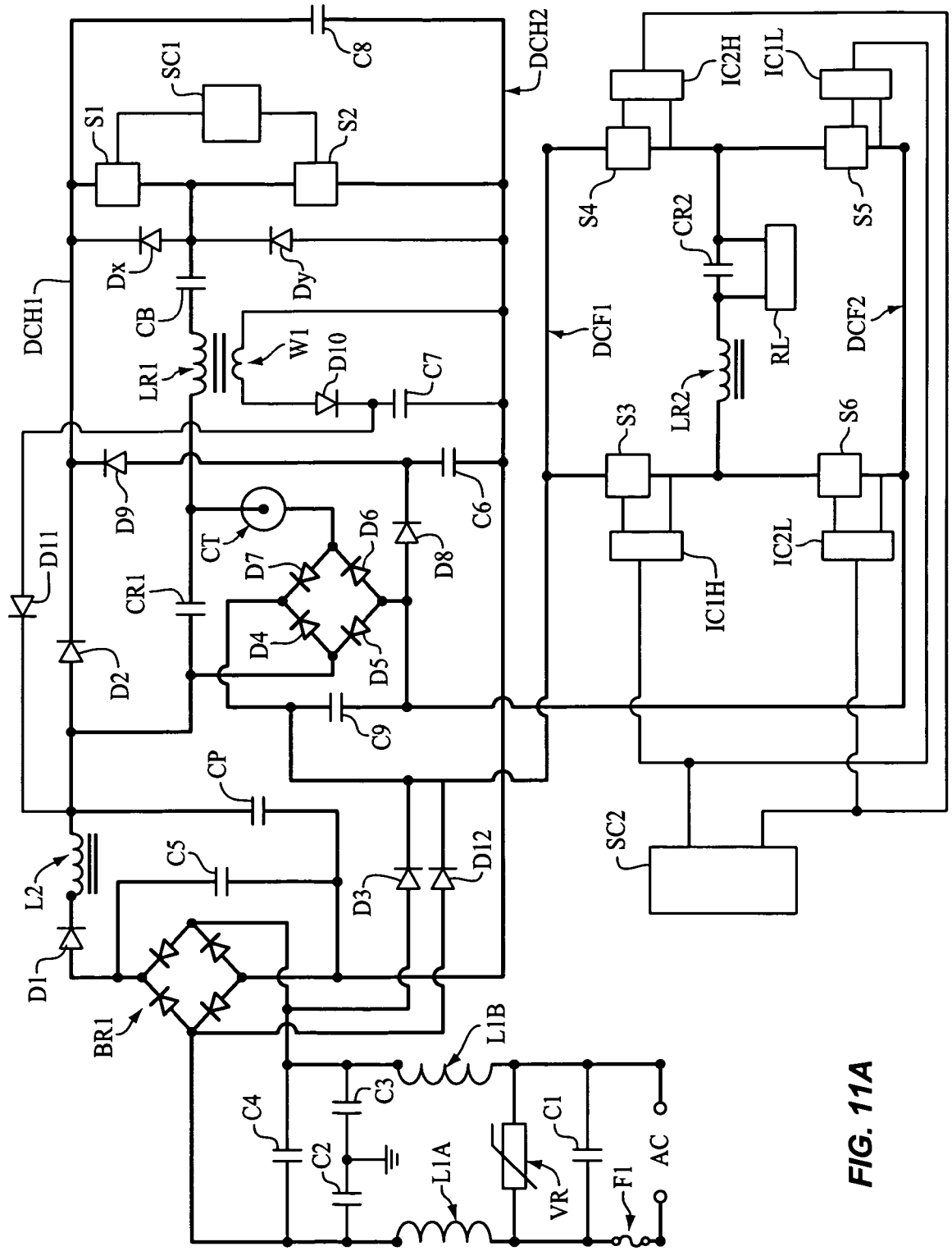
FIG. 11A illustrates a variation of FIG. 1, whereby an inductor L2 is connected between the diode D1 and D2.
Figure 11B:
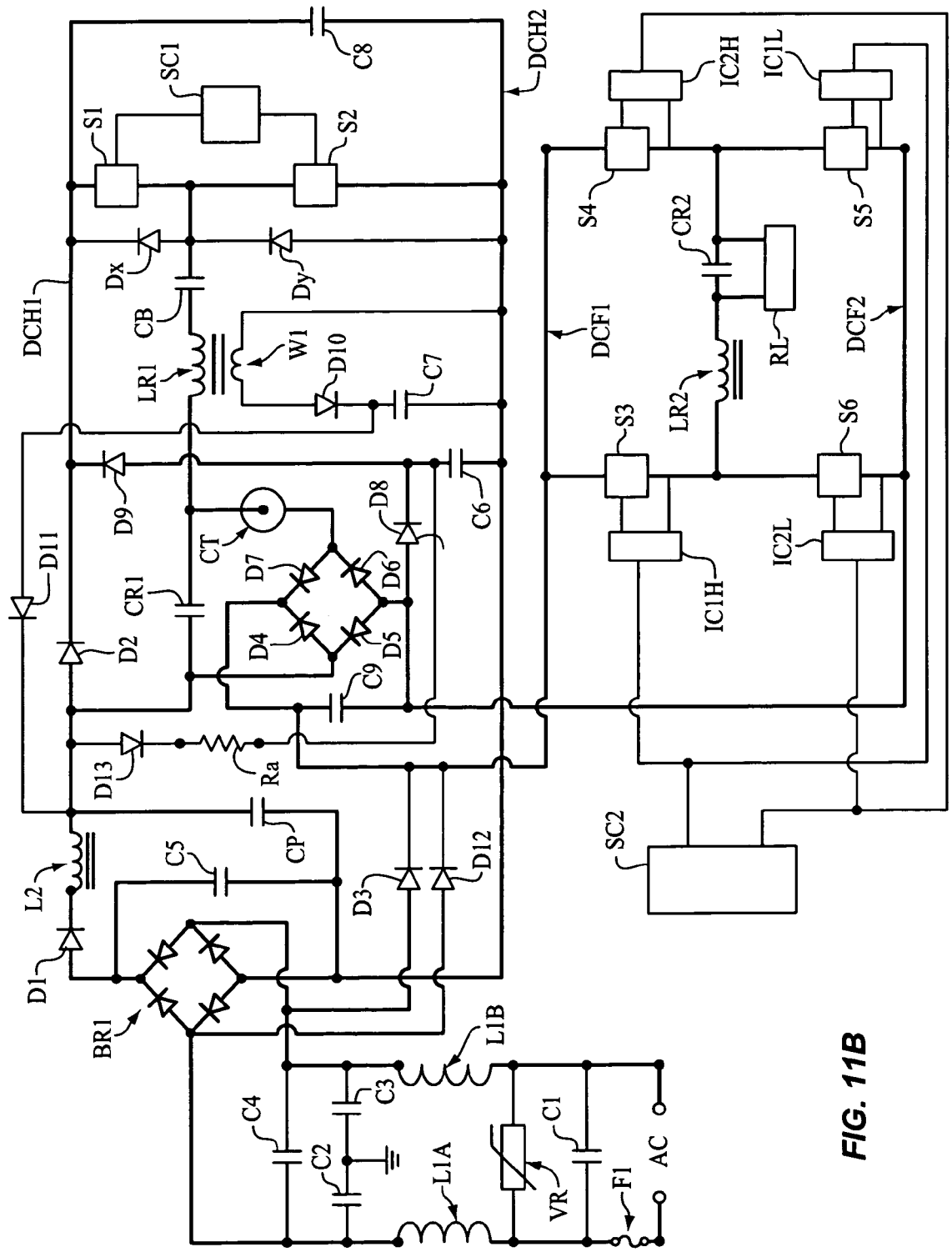
FIG. 11B illustrates a variation of FIG. 11A, whereby a series connected diode D13 and a resistor Ra are added between D2 anode and D8 cathode for delivering additional charging current during the lamp breakdown voltage generation.

Additional Electronic Ballast Using a Single Stage "Line Side Converter" Topology FIG. 1 is a variation of FIG. 10C, whereby two diodes D3 and D12 directly connect the AC lines to DCF1. This circuit arrangement bypasses the diode D1 and thereby further improves power conversion efficiency. FIG. 11A is a variation of FIG. 1, whereby an inductor L2 is connected between the diode D1 and D2. This arrangement further improves the AC line total harmonic distortions. FIG. 11B is a variation of FIG. 11A, whereby a series connected diode D13 and a resistor Ra are added between D2 anode and D8 cathode for delivering additional charging current during the lamp breakdown voltage generation.

The circuits of FIGS. 1, 11A, and 11B utilize a half bridge inverter for single stage power conversions. Nonetheless, without deviating from the scope of this HID electronic lamp ballast, single stage power conversions can also be achieved by using such popular switch mode topologies as full bridge, fly-back, push-pull, and forward converter topologies.

For the purpose of the following description, the circuit of FIG. 1 is used as an example. The HID electronic lamp ballast uses a "set of controls" which can control energy delivery by the "line side converter" to the "lamp side inverter". These are: 1) open circuit voltage control, 2) breakdown voltage amplitude control, 3) glow-to-arc transition current control, 4) "initial arc development" current control, 5) "arc stabilization" current control, 6) lamp power control, 7) lamp dimming, 8) "lamp rectification" current control, and 9) short circuit and lamp fault protections. One of the primary advantages of this "line side converter" energy delivery control method is that it doesn't need to vary the lamp operating frequency to achieve the above control, in particular, during the glow-to-arc transition state. This is further explained as follows.

Following a lamp breakdown, the most critical transitional states where an HID lamp may suffer substantial electrode sputtering, extinction, and "lamp rectification" are the glow, glow-to-arc, and high frequency to low frequency transition states. Further, for HID electronic ballasts that employ a frequency sweep method for the lamp ignition, the operating frequency continues to decrease following a breakdown while the lamp impedance experiences dynamic changes. These conditions create difficult challenges for lamp current control that require simultaneous monitoring of the lamp voltage, the lamp current, and the lamp frequency, or a combination thereof. The lamp voltage and the lamp frequency are not only difficult to monitor during the glow-to-arc transition but, as stated earlier, they also change depending on the cold lamp start vs. hot re-ignition, lamp-to-lamp variations, and lamp aging. U.S. Pat. No. 6,160,362 teaches an arc current control scheme that is based on the lamp operating frequency variations in steps. The arc current control means by lamp operating frequency variations in multiple steps, while the frequency was already varying following a breakdown, and that the lamp impedance characteristics do not remain constant, are not only complex but also difficult to implement with precisions, in particular, during the glow-to-arc transition periods.

Further, U.S. Pat. No. 7,187,136 teaches monitoring both the lamp voltage and the lamp current, which are then compared with predetermined set values in a microprocessor for controlling the lamp power by controlling the current output of a boost-fly back type "line side converter". As stated earlier, it is difficult to monitor the lamp voltage during the arc-to-glow periods, but also it can vary depending on the lamp brand and operating conditions. Further, this method of the lamp current control cannot distinguish between the glow-to-arc stabilization current and the "lamp rectification current", which is explained in more details in the following disclosures.

Line Side Converter Energy Delivery Control

The "line side converter" energy delivery control scheme of the HID electronic lamp ballast requires only to sense the lamp current and not the lamp frequency or the lamp voltage for controlling the lamp current, in particular, during the glow-to-arc phase. This simplifies feedback control loops and, therefore, yields higher accuracy and stability. A "line side converter" that is based on the single stage power conversion circuit of FIG. 1 offers an additional benefit. This is explained as follows. During the glow-to-arc transition period, as well as during the arc development, the lamp impedances vary constantly, including almost creating a short circuit condition. These dynamic lamp impedance changes often require a fast sensing type feedback control scheme to prevent momentary large arc current flowing into the lamp. These are very difficult to achieve in a boost-buck based electronic ballast. On the other hand, in FIG. 1, the load output of a single stage resonant converter inherently behaves like a very fast acting impedance power source. This fast acting impedance power source, which supplies power to the lamp inverter, combined with the lamp current feedback can control the arc current on a real time basis with precision. Further, this fast acting impedance power source property not only assists in controlling the arc current into the lamp but also assists in maintaining the required amount of the open circuit voltage when it is required and as demanded by the lamp for sustaining the glow discharge. In other words, this particular property of the "line side converter" assists in creating a favorable condition for the lamp whereby the electronic ballast circuitries and feedback controls follow the time dependent glow-to-arc characteristics of an HID lamp but not the other way around.

Control and Implementation of High Intensity Discharge Electronic Lamp Ballast

Figure 4:
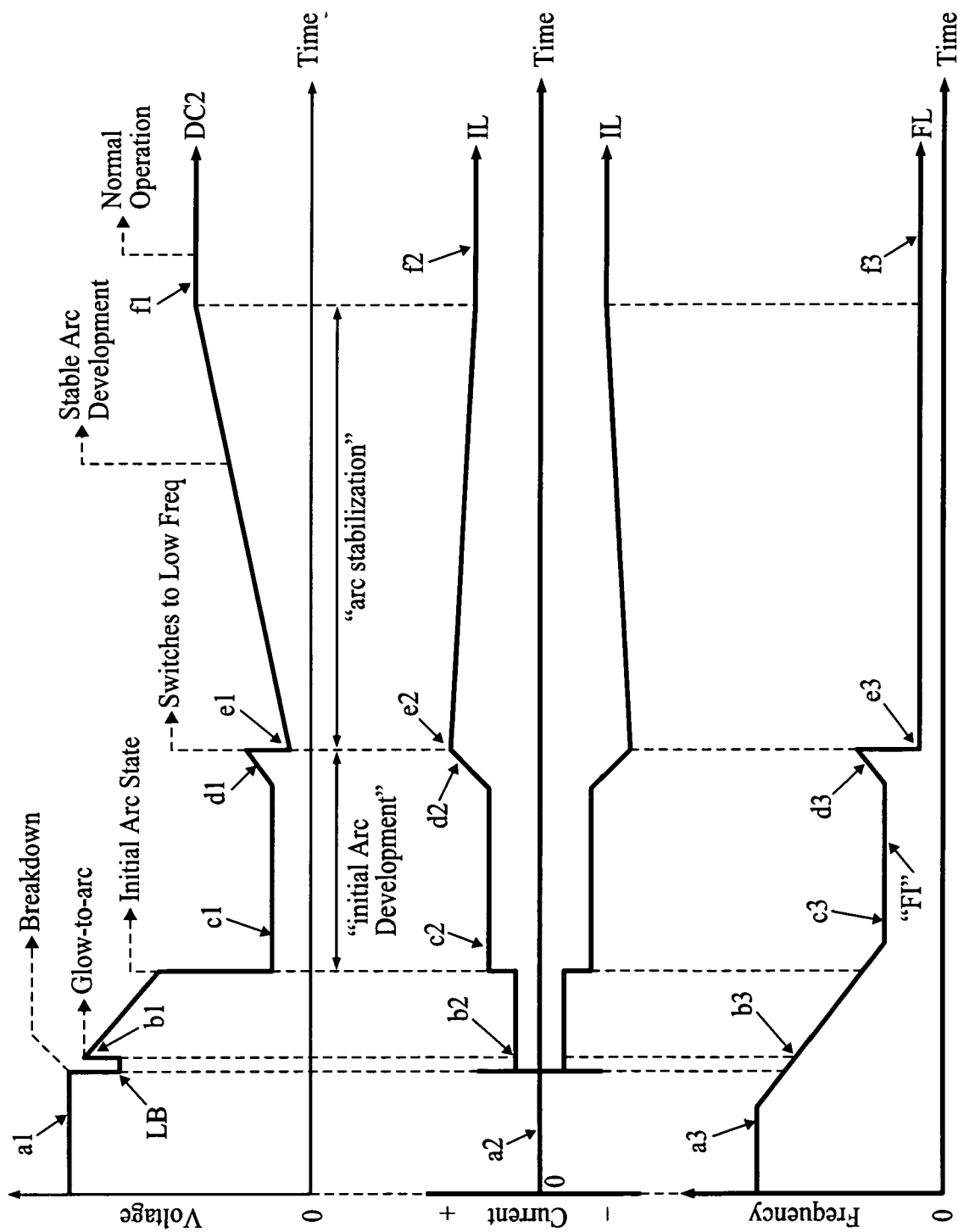
FIG. 4 illustrates the DC bus voltage that appears across an HID lamp during the breakdown and until the lamp enters into a stable operating mode.
Figure 5:
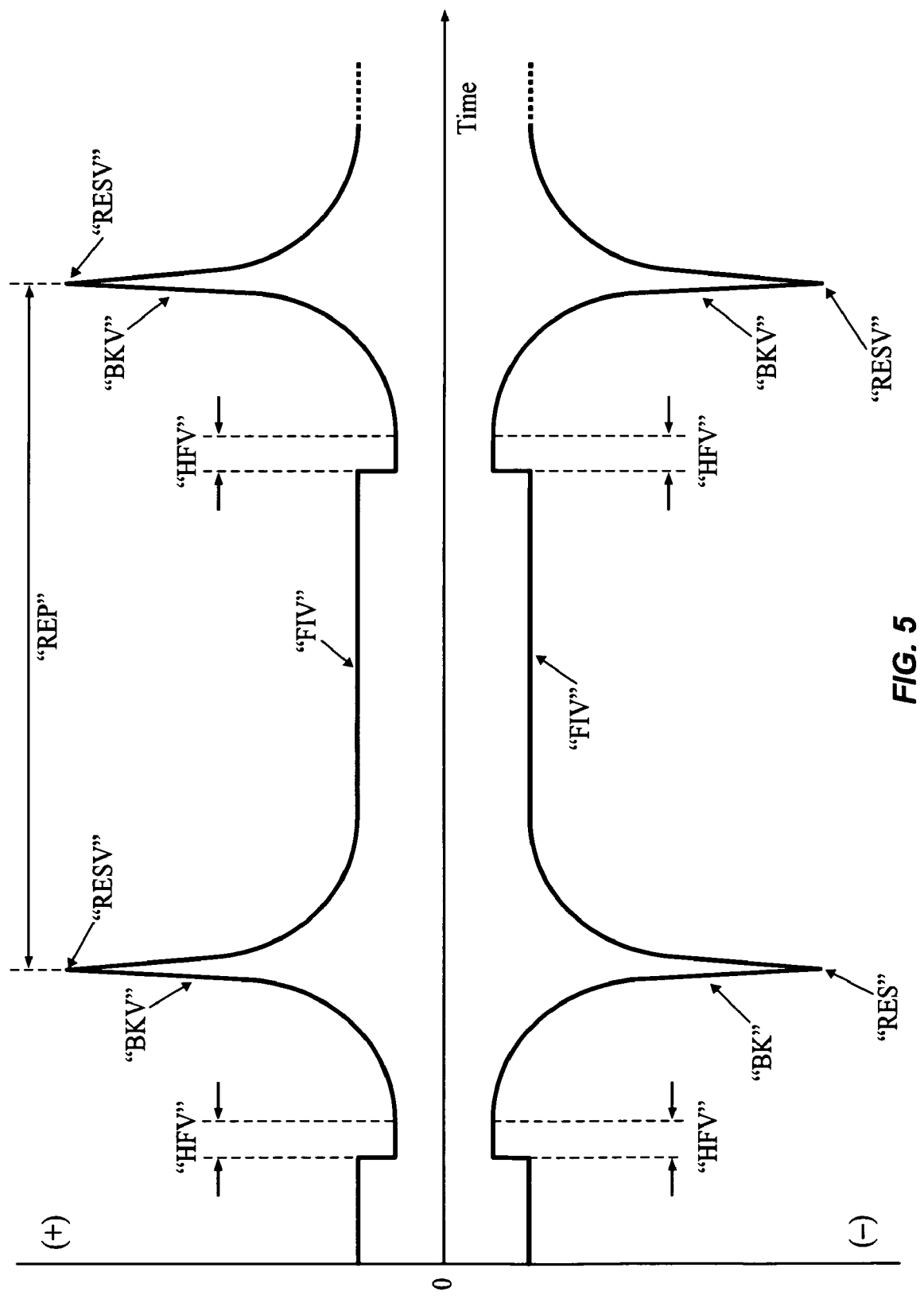
FIG. 5 illustrates a graph of the ignition voltage profile of an HID lamp.

The following disclosures are the foundations of the control and implementation schemes under this HID electronic lamp ballast. The graph DCF1 in FIG. 4 shows the DC bus voltage that appears across an HID lamp during the breakdown and until the lamp enters into a stable operating mode. The graphs FL and IL in FIG. 4 are the corresponding lamp operating frequency and the lamp current. The lamp voltage, the lamp current, and the frequency values that are shown in FIG. 4 are normalized for illustrations. The arrows a1, a2, and a3 indicate the voltage, lamp current, and operating frequency prior to generating the breakdown voltage, respectively. This frequency is set approximately at 250 kHz. The arrows b1, b2, and b3 indicate the voltage, lamp current and, operating frequency, respectively, when the lamp enters into a glow state following a breakdown. The voltage b1 is set approximately at 290V.

The arrow LB shows that, prior to entering into the glow state and at the instant of the breakdown, the voltage across the lamp drops for a short duration, which corresponds to the impedance drop B1 in FIG. 2. The arrows c1, c2, and c3 indicate the voltage, lamp current, and operating frequency, respectively, during the "initial arc development" period. This voltage c1 is approximately 50V. The current c1 is set at a higher level than the glow state current and approximately corresponds to lamp normal operating current. The operating frequency settles to an intermediate frequency, "FI", and it is usually set at approximately 6 kHz. It can be noticed that the difference between the glow state voltage b1 and the "initial arc development" voltage is approximately 240V. Therefore, this sharp voltage drop may be used for detecting the transition between the glow state and the "initial arc development" state. The arrows e1, e2, and e3 indicate the voltage, lamp current, and the frequency at the beginning of the "arc stabilization" period.

The arrows f1 and f2 indicate the voltage and the operating frequency during the normal lamp operation. Arrow e3 corresponds to the normal lamp operating frequency, and usually it is less than 300 Hz.

Further, the arrows d1, d2, and d3 in FIG. 4 indicate that, following the "initial arc development" period and prior to switching to a low operating frequency, there is an increase of the voltage, lamp current, and operating frequency. This particular feature is not inherent to the characteristics of an HID lamp; rather, this is one of the novel control schemes under this HID electronic lamp ballast as follows. Following the "initial arc development" period and prior to switching to the low operating frequency, if the arc current is increased, it causes the lamp to smoothly switch to its low operating frequency. This technique substantially prevents the lamp from entering into a "lamp rectification" state, which is often the case. A further explanation is as follows. Often an HID lamp may extinguish or may draw large current while transitioning from a high frequency to a very low operating frequency; it may even enter into a "rectification state". These problems become severe if the arc current in the lamp was lower than the nominal lamp operating current prior to transitioning to the low operating frequency. The following conditions ensure a smooth transition. First, following the glow-to-arc state when the lamp enters into the "initial arc development" state and prior to switching to the low operating frequency, the lamp operating frequency is stabilized preferably at least a period of one second. The frequency stabilization is necessary, in particular, when an electronic ballast employs frequency sweep ignition scheme. Second, following this stabilization period and prior to the switching to the low operating frequency, the arc current is increased such that it is higher than but not twice the nominal lamp operating current.

Arc Current Control

There are many ways the arc current into the lamp can be increased prior to the switching to the low operating frequency. One of the preferred ways this can be achieved is by increasing the operating frequency of the lamp. This can be explained as follows. Prior to switching to the low operating frequency and while the lamp is in the "initial arc development" state and operating with a stable frequency, an increase in the lamp operating frequency causes lamp impedance to rise. Due to the nature of the output characteristics of a single stage series resonant circuit of FIG. 1, higher impedance across the series resonant capacitor CR1 causes more current to flow into the lamp. The frequency increase prior to switching to a low operating frequency is usually 4 kHz. In other words, the 6 kHz intermediate frequency, "FI", increases to approximately 10 kHz.

Figure 3:
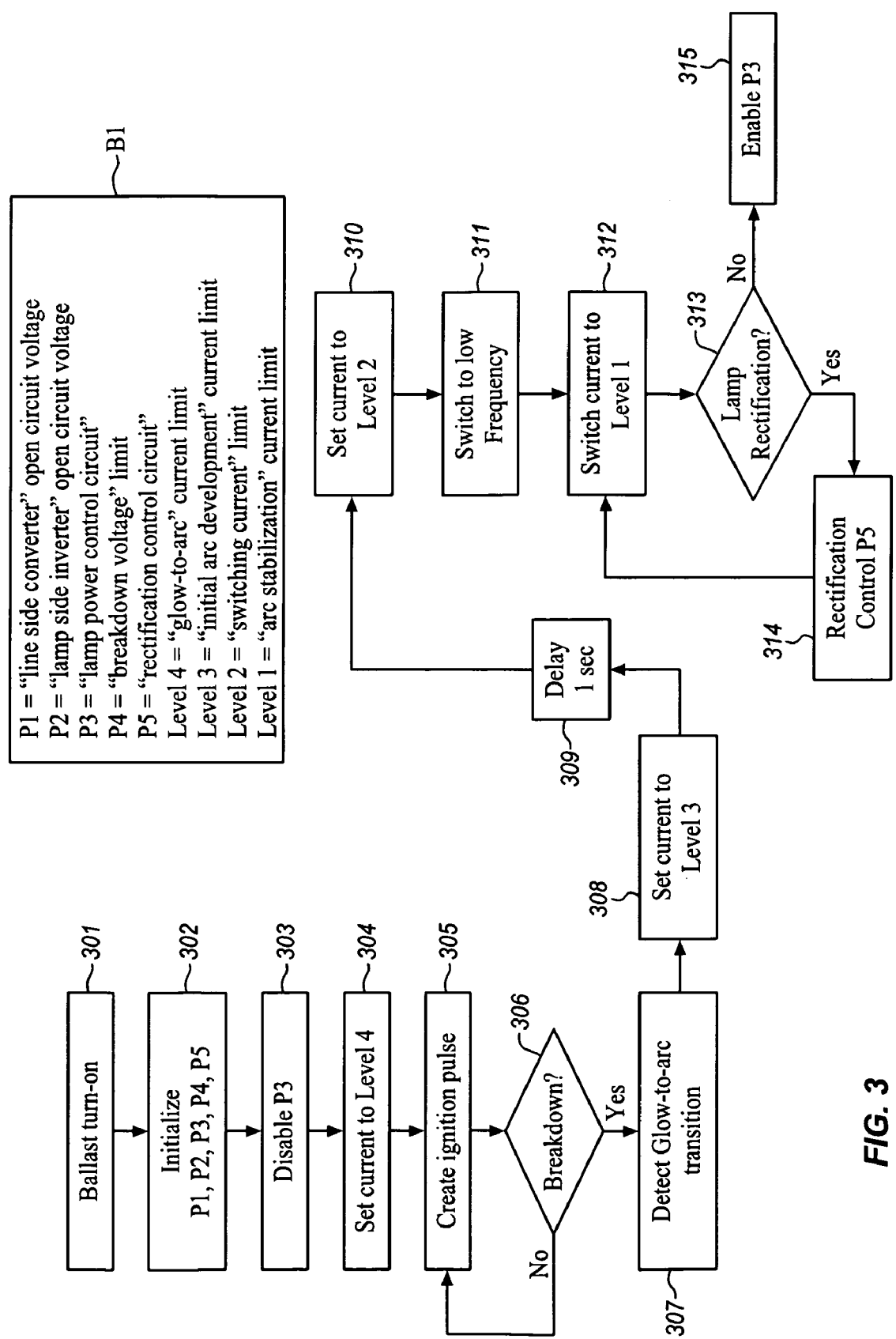
FIG. 3 is a flow chart that describes the "design guide" sequential control functions.

FIG. 3 is a flow chart that describes the "design guide" sequential control functions of this HID electronic lamp ballast and is based on simple executable commands and functions that easily can be embedded in a microprocessor based circuit. The scope of the above flow chart control scheme is broad, which includes, but is not limited to, the electronic ballast topologies of FIGS. 7, 8, 1, and their variations thereof. The following description of an analog control circuit follows the flow chart of FIG. 3. The half bridge control circuit SC1 and the full bridge control circuit SC2 of FIG. 1 that houses control circuits are described in conjunction with a conventional switch mode IC which not only provides controlled PWM drives to power switches but also provides a stable voltage reference, programmable dead time, precision duty cycle, or frequency variation options. Further, its output frequency easily can be made to vary from 80 Hz to 350 kHz. Its combined features eliminate the need for expensive A-to-D and voltage controlled oscillators in a switch mode power supply design. Nonetheless, the control circuits that are associated with SC1 also can be incorporated in conjunction with a self-oscillating half bridge driver IC. Similarly, the control circuit SC2 can also be designed around a self-oscillating full bridge driver IC. These devices, in addition to generating controlled PWM, also provide high side drive isolation by means of level shifting circuits. However, in many circumstances, these devices require extra components and special circuit lay out for providing immunity from switching noises. The high voltage and high power electronic HID ballasts that use these devices are more prone to failure.

Whereas, the PWM drive output that is isolated by pulse transformers and high speed optical drivers is more reliable in harsh environment.

Half Bridge Control Circuit

Figure 12:
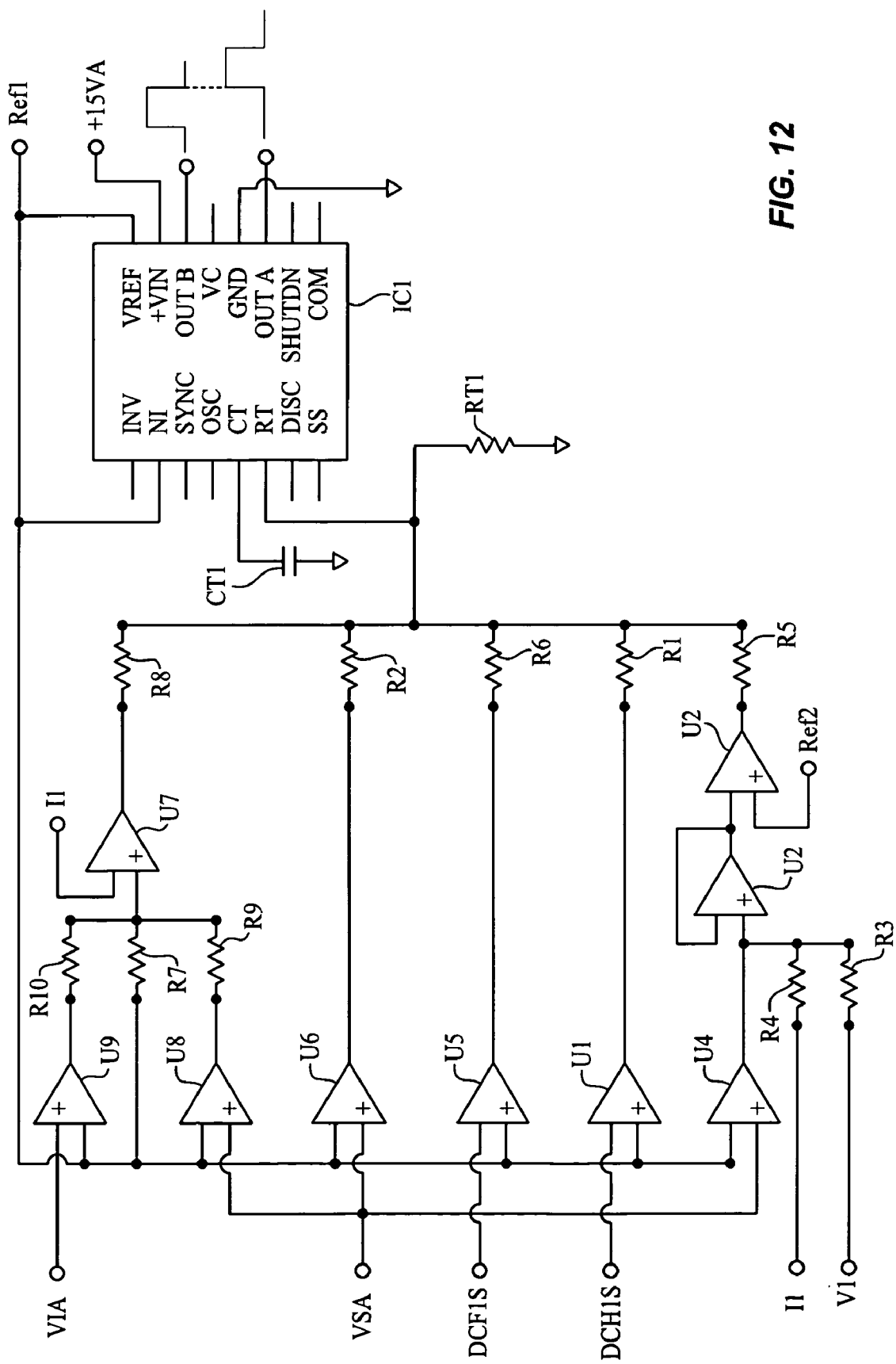
FIG. 12 describes the half bridge control circuit SC1 of FIG. 1.

FIG. 12 describes the half bridge control circuit SC1 of FIG. 1. The IC1 is a conventional switch mode integrated chip; and Pin 1, Pin 2, and Pin 9 are inverting, non-inverting, and output, respectively, of an internal comparator. Pin 5 and Pin 6 are for setting timing for an internal oscillator. Pin 5 accepts a timing capacitor CT1, and Pin 6 accepts a timing resistor RT1. Pin 11 and Pin 14 are for PWM outputs. Pin 16 provides a 5 V reference output. The PWM output from Pin 11 and Pin 14 can drive power switches of a half-bridge or a full-bridge inverter. High side drive isolation can be provided by a conventional pulse transformer, an optical isolation, or by level shift circuits. By varying the value of an individual timing component or both components that are connected to Pin 5 and Pin 6, the output drive frequency can be varied. The PWM duty cycle can be varied by varying the voltage that appears at Pin 2.

The power delivery capacity by the "line side converter" to a load can be controlled either by varying its operating frequency or by varying duty cycles. Frequency control vs. duty cycle control is a matter of choice. Therefore, although the following description utilizes frequency control techniques for controlling power delivery by the "line side converter" to the "lamp side inverter", duty cycle control techniques also yield similar results.

The combination of the timing components RT1 and CT1 in FIG. 12 determines the minimum operating frequency of the "line side converter" which, in turn, sets the limit on maximum power delivery capacity by the "line side converter" to a load. An increase in the operating frequency reduces the power delivery capacity. One of the convenient ways of increasing the operating frequency is simply by pulling down the Pin 6 of the IC1 via an external resistor. The lower the value of this external resistor, the higher the operating frequency.

Operating Process

Upon connecting the AC power at step 301 to the device, and prior to generating the breakdown voltage, the following are initialized at step 302: "line side converter" open circuit voltage, "lamp side inverter" open circuit voltage, lamp power control circuit, "breakdown voltage" limit, and rectification control circuit. In implementing these steps, the following takes place:

IC1 and all other required devices are powered by a low voltage supply, +15V, which is generated from a secondary winding (not shown) in LR1 in FIG. 1. Further, the reference voltage Ref1 is 5V. It is provided by Pin 16 of IC1.

P1="line side converter" open circuit voltage limit set—the comparator U1 sets a limit on the "line side inverter" voltage, DCH1 in FIG. 1, as follows: when a sense voltage DCH1S that corresponds to DCH1 exceeds the preset voltage limit as set by the reference voltage Ref1, U1 pulls down the resistor R1 to the circuit ground causing an increase in the operating frequency, which in turn limits and regulates the "line side converter" open circuit voltage. Furthermore, this open circuit control scheme also provides AC line over voltage protections.

P2="lamp side inverter" open circuit voltage set—the comparator U5 sets the magnitude of the "lamp side inverter" open circuit voltage DCF1 as follows: when a sense voltage DCF1S that corresponds to DCF1 voltage exceeds the reference voltage Ref1, U5 output pulls down the resistor R6 to the circuit ground, causing an increase in the operating frequency, which thereby regulates the "lamp side inverter" open circuit voltage (DG1), which is usually 300V.

P3="lamp power control" deactivation—in order to precisely control the glow-to-arc current and until the lamp switches to the low operating frequency, the normal operating lamp power control circuit is disabled at step 303. This is accomplished as follows: the output terminal of a comparator U4 is connected to the non-inverted terminal of a summing amplifier U2, the non-inverted terminal is connected to VSA, and the inverted terminal is connected to the reference voltage Ref1. At turn on, zero volts appears at VSA and, therefore, U4 output pulls down the non-inverted input of U2 to the circuit ground. The summing amplifier U2, the comparator U3, and associated resistors R3, R4, and R5 are for lamp power control. The resistor R3 senses the lamp voltage, V1, and the resistor R4 senses the lamp current, I1. The resistor R5 is connected between the output of U3 and the Pin 6 of IC1. The reference voltage Ref2 sets the operating power (DG9) in the lamp. A detailed description of this circuit can be found in U.S. Pat. No. 7,199,528.

P4="lamp breakdown" voltage set—limiting power delivery capacity of the "line side converter" controls the amplitude of the breakdown voltage. This is executed as follows: the inverted input of a comparator U6 is connected to Ref1, the non-inverted input is connected to VSA, and the output terminal is connected to Pin 6 of IC1 via a resistor R2. Since VSA is at zero volts, this causes the "lamp side inverter" to operate at a higher frequency during the breakdown voltage generating phase. This higher operating frequency, which is set by U6 and R2, is called F1. Power delivery capacity by the "line side converter" to the "lamp side inverter" is determined by F1; hence, this can be set such that the breakdown voltage peak doesn't increase more than 3,500V (DG3).

The comparator U7 performs five functions as follows: a) further limits circulating current into the resonant tank LR2 and CR2 that generates the breakdown voltage of step 305, b) sets "glow-to-arc" current limit at step 304, c) sets "initial arc development" current limit, d) sets "arc stabilization" current limit, and e) sets limit on the "lamp rectification" current. All of these functions are performed by sensing lamp current and by comparing this current with three distinct step reference voltages. These are explained as follows:

Level 1="arc stabilization" current limit set—the reference voltage Ref1 is fed by a resistor R7. When lamp current I1 exceeds Ref1, U7 pulls down the resistor R8 to the circuit ground, causing operating frequency to further increase, which is called "F2". Ref1, which corresponds to "Level 1" of FIG. 3, sets the limit on the "arc stabilization" current (DG7), which is higher than the "initial arc current".

Level 3="initial arc development" current limit set—the inverted input of a comparator U8 is connected to Ref1, the non-inverted input is connected to VSA, and the output is connected to the non-inverted pin of U87 via a resistor R9. Since at turn-on VSA is at zero volts, it causes U8 to pull down the resistor R9 to the circuit ground. This causes a lowering of the reference voltage at the non-inverted terminal of U7, with is called Ref3 (not shown), and the corresponding operating frequency is called "F3". Ref3, which corresponds to "Level 2" of FIG. 3, sets the limit on the "initial arc development" current (DG5), which is lower than the "arc stabilization current".

Level 4="glow-to-arc" current limit set—the inverted input of a comparator U9 is connected to Ref1, the non-inverted input is connected to VIA, and the output is connected to the non-inverted pin of U9 via a resistor R9. At turn-on, the voltage that appears at the VIA terminal is also zero volts. Therefore, this causes U9 to pull down the resistor R9 to the circuit ground. This action further reduces the magnitude of the reference voltage at the non-inverted terminal of U7, which is called Ref4 (not shown), and the corresponding operating frequency is called "F3". Ref4, which corresponds to "Level 3", sets the limit on the breakdown and the "glow-to-arc" transition current (DG4), which is lower than the "initial arc current".

The ballast provides periodic breakdown voltage pulses at step 305 to the HID lamp in a manner that causes the lamp to breakdown at a lower voltage, which reduces sputtering of cathode materials. At the instant the lamp enters into the beginning of the arc phase at step 306, the lamp voltage drops substantially. This is shown by the arrow c1 in FIG. 4. The control circuit in the "lamp side inverter" senses this voltage drop at step 307 whereby approximately 15V is developed at the terminal VIA, which in turn provides this voltage to the non-inverted input of U9. This action disables the output of U9; therefore, the reference voltage Ref3 at the non-inverted terminal of U7 determines the "initial arc development" current (DG5) magnitude at step 308, which is higher than the "glow-to-arc" current but lower than the "arc stabilization" current. This is the "initial arc development" period, which begins as soon as the lamp enters into the arc phase and thereafter lasts a period of preferably not less than 1 second at step 309. At step 310, the ballast provides a controlled current into the lamp, which controlled current is higher than the glow-to-arc state current but lower than the "arc stabilization" current. These thresholds minimize cathode sputtering while also preparing the lamp for a smooth transition to the low operating frequency.

Lamp Frequency Switches to its Low Operating Frequency

At the instant lamp frequency switches to its low operating frequency at step 311, the sensing circuit in the "lamp side inverter" provides a signal whereby approximately 15V develops at the terminal VSA, which in turn provides this voltage to the inverted input of the comparator U4, U6, and U8 causing the following: a) to activate the lamp operating power control circuit, and b) the comparator U7 current sensing threshold to increase to the level as determined by Ref1, which is the preset limit for "arc stabilization" current (DG7) at step 312.

At the instant the lamp switches to the low operating frequency (DG6), if the lamp enters into a partial or total "rectification mode", a "lamp rectification" detection circuit in the "lamp side inverter" at step 313 immediately removes the 15V signal from the terminal VSA at step 314. This action limits current into the lamp (DG8) as set by the reference Ref3 at the non-inverted terminal of U7 in FIG. 12 causing the lamp to recover from the "lamp rectification" state quickly.

As the arc in the lamp fully develops, and as the lamp enters into the normal operating state, the lamp power control circuit U2 and U3 as set by Ref2 regulates a specified power (DG9) into the lamp by controlling the operating frequency of the "line side converter" at step 315.

"Lamp Side Inverter" Control Circuit

Figure 13:
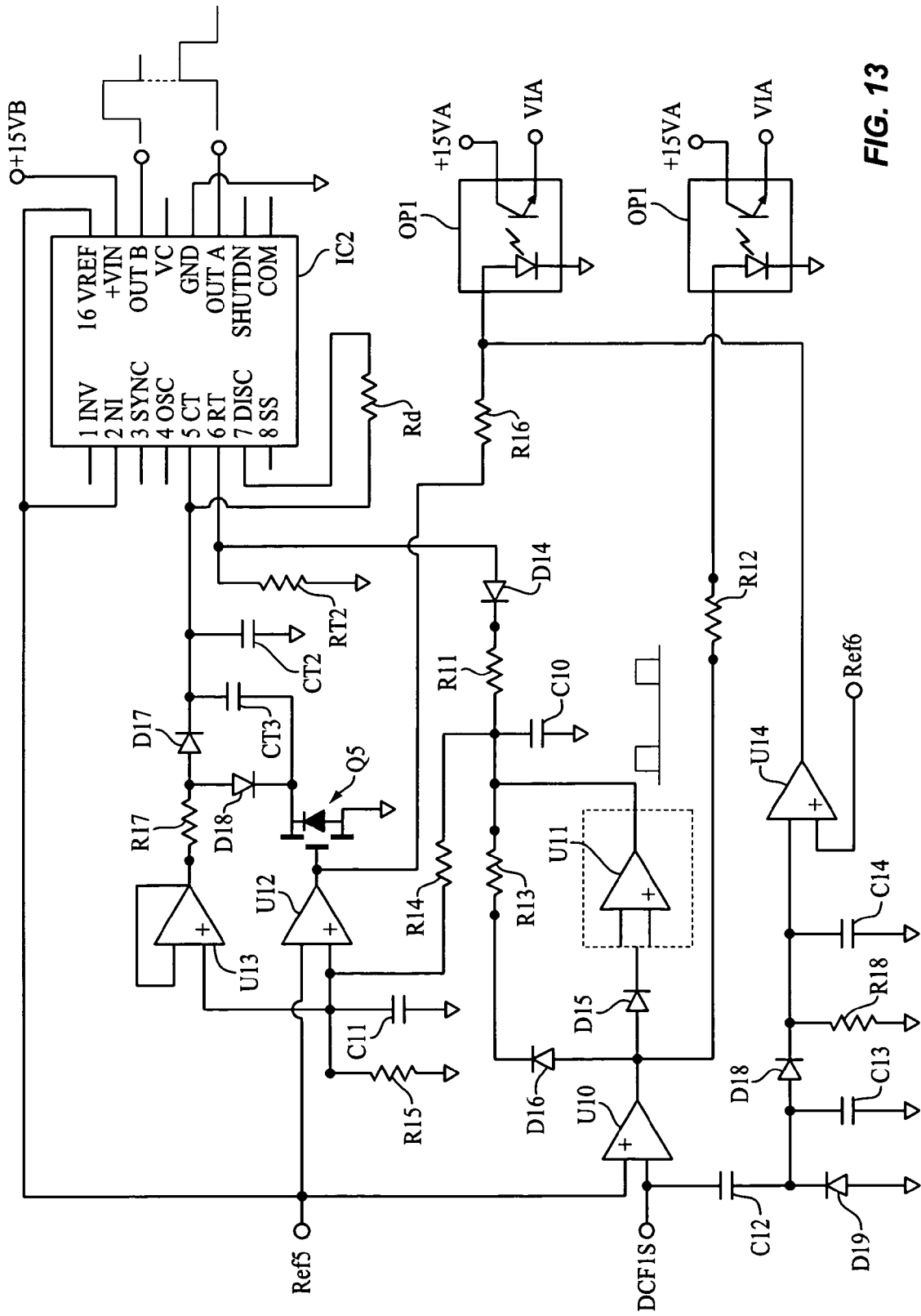
FIG. 13 discloses the "lamp side inverter" control circuit SC2 of FIG. 1.

FIG. 13 discloses the "lamp side inverter" control circuit SC2. As before, IC2 is a switch mode integrated chip, SG2525. At turn on, IC2 and all other required devices are powered by a low voltage supply, +15VB. RT2 and CT2 are timing resistor and timing capacitor, respectively, for the internal oscillator, which in turn sets the inverter's intermediate operating frequency "FI", which is approximately 6 kHz.

As explained earlier, upon application of AC power to the device and prior to generating the breakdown voltage, the open circuit DC bus voltage DCF1 magnitude is controlled by the control circuit of the "line side converter". In FIG. 12, a separate comparator U10 also senses this voltage. The corresponding sense voltage is DCF1S. The comparator U11 generates a low voltage square wave using conventional circuit (not shown) for a duration that is approximately 100 milliseconds with an interval of approximately 10 seconds. It must be noted that these are arbitrary settings. The output of U11 periodically discharges the capacitor C10. During the discharge period, the resistor R12, which is connected to Pin 6 of IC2 via a blocking diode D14, gets connected to the circuit ground. This action raises the operating frequency of the "lamp side inverter" immediately to a preset value, for example, 300 kHz. After 100 milliseconds when the square wave signal is removed, the Pin 6 of IC1 starts to charge the capacitor C10. The voltage that Pin 6 can provide is approximately 5V. The resistor R11 and the capacitor C10 determine the charging rate. As C10 receives charging current, the operating frequency of the inverter gradually starts to decrease and settles to the frequency "FI". These increases and decreases of the operating frequencies prior to the lamp breakdown are often termed "frequency sweep".

The above frequency sweep scheme behaves as follows: a) the square wave generator U11 discharges C10 quickly, resulting in a sharp transition from the intermediate frequency "FI" to a frequency that is above 300 kHz, and b) upon removing the square wave signal, C10 slowly starts to charge causing a gradual decrease in frequency. This decreasing frequency causes the voltage across an HID lamp to gradually increase, which reaches its peak when the frequency crosses the resonance. This ignition voltage profile is depicted in FIG. 14. Accordingly, "HFV" indicate the voltage when the frequency is switched to 300 kHz for a period of approximately 100 milliseconds. The arrows "FIV" indicate the voltages during the intermediate frequency "FI" period, and the arrows "RESV" indicate ignition voltages when frequency approaches the resonance. Further, "FIV" equals approximately the "lamp side inverter" open circuit voltage, which is approximately 290V. Further, the arrow "REP" indicates the ignition sweep interval period.

In addition, the above frequency sweep scheme is not affected by at least ±10% variations in start and end frequencies. Therefore, standard components can be used in the actual design. The "lamp side inverter" open circuit voltage determines the voltage "FIV" during the intermediate frequency period. Therefore, by changing the open circuit voltage settings, part of the time "FIV" may be reduced to a lower value including zero voltage. This is depicted in FIG. 15 and indicated by "FIV2". Due to the fast transition control scheme of FIG. 13, the transition from "FIV" to "HFV" is instantaneous. Therefore, the ignition sweep begins from approximately 300 kHz and settles to approximately 6 kHz at the end of each sweep. This frequency sweep method causes the following: 1) 300 kHz starting frequency creates higher electron collision frequency, and 2) breakdown voltage pulses to increase gradually, reaching a peak at the resonance frequency. In other words, high frequency breakdown pulses grow progressively. Further, increased collision frequency and progressively growing ignition pulses cause a breakdown at a lower voltage. This is indicated in FIG. 14 by the arrows "BKV". Further, this ignition scheme can also ignite a cold HID lamp in a single attempt.

The above ignition scheme generates the breakdown voltage at or near resonance. This mandates a careful selection of the core materials for the resonant inductor. As described earlier in order to avoid core saturations, high flux magnetic materials such as "kool-μ", manufactured by Magnetics, Inc., USA, may be used to construct LR2. It requires over 10,000 gauss to saturate "kool-μ" materials and since, they become "lossy" at high frequency, they inherently limit current flow into the resonant tank. This property, when combined with the reduced power delivery scheme during breakdown, further ensures breakdown voltage not to exceed 3,500V (DG3).

Immediately following a breakdown, the lamp impedance drops drastically for a very short period of time. This was explained earlier and indicated by the arrow B1 in FIG. 2. However, since a progressively growing ignition scheme causes a breakdown below or near resonance, a short circuit across the resonant capacitor CR2 can only draw a finite amount of current. An example is given as follows: LR2~0.3 mH and CR2~0.0022 microfarad, which resonates at ~196 kHz. Further, 196 kHz has a period ~5 micro-seconds. Assuming an open circuit voltage ~290V, LR2 limits current ~2.5 A into a 1 ohm load.

The above breakdown scheme, when combined with the fast acting load impedance characteristics of the "line side converter" of FIG. 1, provides optimum breakdown-to-glow and glow-to-arc transitions. Further, following the breakdown and the glow state as the lamp enters into the beginning of the "initial arc development" phase, the lamp voltage drops noticeably, as indicated by the arrow c1 in FIG. 4. The comparator U10 in FIG. 13 detects this voltage drop by comparing it with the reference voltage Ref5, which is 5V. This in turn causes U10 output pin to provide approximately 15V DC signal: a) to the comparator U11 via a blocking diode D15 for the purpose of disabling the square wave generator, b) to the capacitor C10 via a blocking diode D16 and a resistor R13 for raising its voltage to approximately 15V, and c) to an optical isolator OP1 via a resistor R12 for the purpose of activating the optical isolator, which in turn provides approximately 15V to the terminal VIA in FIG. 12 causing a higher "initial arc development" current to flow into the lamp, which corresponds to Level 3 in FIG. 3.

As the capacitor C10 gets charged and its voltage exceeds approximately 4V, the "lamp side inverter" starts to operate at the frequency "FI". Further, the voltage across C10 is also fed to a delay network formed by the resistors R14, R15, and C11, which are connected to the non-inverted input of a comparator U12. The inverted input of U12 is connected to Ref5. The output of U12 is connected to the following: a) a small signal MOSFET Q5, and b) an optical isolator OP2 via resistor R16. When voltage at the non-inverted input of U9 exceeds 5V, Q5 and OP2 are turned on.

A voltage follower U13 is placed in the circuit of FIG. 12 as follows: a) it is powered by a 5V supply for the purpose of its output not to provide more than 5V, b) the non-inverted input is connected to the junction of the resistor divider R14 and R15, and c) the output is connected to the Pin 5 of IC2 through a resistor R17 and a blocking diode D17. As voltage develops across C11, and when the voltage exceeds approximately 1.5V, the voltage follower U13 starts to send an additional charging current via the resistor R17 to the Pin 5 of IC2. In turn, this causes the "line side inverter" operating frequency to increase until the voltage across C11 exceeds 5V. The overall frequency increase is approximately 4 kHz. As a result, and as described earlier, this increase in frequency prior to switching to the low operating frequency causes an increased arc current into the lamp, which is higher than the normal lamp operating current but not exceeding the "arc stabilizing" current.

The turn-on of the MOSFET Q5 causes a) the timing capacitor CT3 to get connected between the Pin 5 of IC2 and the circuit ground whereby the body diode of the MOSFET provides the CT3 charge return path, and b) pulls R17 to circuit ground through a blocking diode D18. In turn, these cause, respectively, a) the operating frequency of the "lamp side inverter" to switch to the low operating frequency (DG6), which is set by the capacitor RT2, CT2, and CT3, and b) disables U13 charging current source to Pin 5.

The turn-on of OP2 causes approximately 15V to appear across the terminal VSA in FIG. 12. In turn, this disables U4, U6, and U8 causing the "line side converter" to deliver the "arc stabilization" current (DG9) as set by Ref1 at the non-inverted terminal of U7 in FIG. 12. Further, as the arc starts to become stable and the lamp starts to draw normal operating current, the power control circuit U2 and U3 in FIG. 12 begins to regulate power into the lamp (DG9).

Lamp Rectification Current Control

Although, there are many ways to detect and limit the "lamp rectification" current, a control scheme that is based on the lamp current sensing means, is only effective when the lamp is operating normally. This can be explained as follows. When a lamp is in its "initial arc development" state and, in particular, when the lamp switches to a low operating frequency due to the higher limit on the "arc stabilization" current, the lamp current detection scheme cannot distinguish between the "arc stabilization" current and an increase in current due to the "lamp rectification". It must be noted that, if a lamp enters into a "lamp rectification state", in particular during the arc development period, unless the rectification current is reduced to a lower value, the lamp may never come out of the "lamp rectification state".

A "lamp rectification" control scheme that is highly effective and responsive to limit "lamp rectification" current during the arc development, as well as during the normal lamp operation phases, is described as follows. The high frequency bridge rectifiers, which are connected across the resonant capacitor CR1 in FIG. 1, provide power to the output load. The filter capacitor C9 value is low, usually 1 microfarad. This low value filter capacitor, in combination with the high frequency resonant power source, make this novel "lamp rectification" control scheme work. This is explained as follows. When a lamp enters into a "lamp rectification" state, it starts to draw an asymmetrical current; that is, one of the polarities of the lamp draws more current than the other. This asymmetrical current drawn by the lamp creates an asymmetrical alternating voltage waveform across the lamp. Since the filter capacitor C9 is a low value capacitor, the asymmetric alternating lamp waveform causes the voltage across C9 to follow. Accordingly, when the lamp voltage is high, the voltage across C9 is also high. Similarly, when the lamp voltage is low, the voltage across C9 is low. It must be noted that a large value filter capacitor will not have the similar response characteristics.

These variations across C9 can easily be detected by means of a known technique, AC coupling, which then may be fed to a comparator for limiting the "lamp rectification" current by controlling energy delivery by the "line side converter". The DC bus voltage sensing means of the "lamp side" converter for the control of the "lamp rectification" by controlling the energy delivery by the "line side converter" is the seventh aspect of this HID electronic lamp ballast. A further explanation of the "lamp rectification" control circuit is as follows.

In FIG. 13, the comparator U14 and the associated components limit the "lamp rectification" current (DG8) as follows. It is well known that a periodically variable DC voltage source has AC contents in it. The capacitor C12 and C13 detects the AC contents of a DC voltage by means of AC coupling. The signal diode D18 allows the DC peaks to appear across C14, and the diode D19 allows a path for charge to return. Further, the capacitor C14 and the resistor R18 act as a voltage integrator. Further, when there is no "lamp rectification", zero voltage appears across C14 whereas, when a lamp enters into a "lamp rectification" state, the diode D18 charges C14, depending on the rectification level, from a few hundred milli-volts to a few volts above zero. This voltage rise then is compared with a reference voltage Ref6 by the comparator U14. When the voltage across C14 exceeds Ref6, the output of U14 disables the optical isolator OP2 by pulling down the resistor R16 to the circuit ground. In turn, this action activates the control circuit U4, U6, and U8 in FIG. 12, limiting the "lamp rectification" current (DG8) as set by Ref3 at the non-inverted pin of U7.

The "design guide" DG10 requires a fast lamp polarity switching. This can be executed as follows. In FIG. 13, the resistor Rd, which is connected between Pin 5 and Pin 7, determines the dead time between the PWM drive output from Pin 11 and Pin 14 of IC2. The higher the value of Rd, the higher the dead time. Therefore, a low value Rd will cause a very fast lamp polarity switching.

Circuit protections from various faults can be achieved as follows:

Short circuit—as stated earlier that the circuit characteristics of "line side converter" in FIG. 1 provide protections against output short circuit. A further explanation can be found in the inventor's US Patent Application No. 2007/0217235.

End of life—old HID lamps exhibit higher operating voltages. Therefore, the lamp operating voltage sense means may be used to disable lamp power circuit permanently.

Lamp cycling—old HID lamps, in particular high-pressure sodium lamps, often exhibit annoying on-off phenomenon. Each square wave output from U11 in FIG. 13 represents one ignition sweep. Therefore, by counting the number of ignition sweeps over a predetermined period, the lamp power circuit may be deactivated permanently.

SUMMARY

The present electronic ballast for High Intensity Discharge (HID) lamps implements precise control of lamp ignition, lamp glow-to-arc currents, and the continued operation of HID lamps. The HID electronic ballast is based on fundamental HID lamp physics and implements a complete electronic ballast architecture that ensures proper lamp ignition and operation.

What is claimed as new and desired to be protected by Letters Patent of the United States is:

1. A control circuit that interconnects a source of AC voltage to a high intensity discharge lamp, for controlling the flow of current through said high intensity discharge lamp, the control circuit comprising:

open circuit voltage supply for supplying a predetermined open circuit voltage to said high intensity discharge lamp;

breakdown voltage supply for providing high frequency voltage pulses of predetermined magnitude with periodic intervals to said high intensity discharge lamp to create a breakdown of said high intensity discharge lamp to a glow state;

arc development current control for providing a controlled current at a controlled frequency into said high intensity discharge lamp, as said high intensity discharge lamp transitions from said glow state to the beginning phase of the arc state, for a stabilization period of no less than one second;

frequency transition circuit for increasing the current into said high intensity discharge lamp following said stabilization period to a level that is not more than two times the normal operating current of said high intensity discharge lamp; and power control, responsive to said frequency transition, for switching said high intensity discharge lamp to a low operating frequency at a normal operating current of said high intensity discharge lamp.

2. The control circuit of claim 1 wherein said arc development current control is responsive to only the high intensity discharge lamp current, not the high intensity discharge lamp frequency or the sensed high intensity discharge lamp voltage, for controlling the high intensity discharge lamp current.

3. The control circuit of claim 1 wherein said arc development current control comprises:

initial arc development circuit, operable as soon as the high intensity discharge lamp enters into the arc phase, for delivering a controlled current of magnitude higher than the glow-to-arc state current and lower than the arc stabilization current for a period of not less than one second; and arc stabilization circuit, responsive to conclusion of operation of said initial arc development, for delivering a controlled current to said high intensity discharge lamp of a magnitude higher than the initial arc development current and not more than two times the normal operating current until said high intensity discharge lamp reaches a normal operating state.

4. The control circuit of claim 1 further comprising:

lamp rectification circuit for limiting asymmetrical current drawn in said high intensity discharge lamp and maintaining current in said high intensity discharge lamp at a level at least as great as the normal operating current of said high intensity discharge lamp.

5. The control circuit of claim 1 wherein said arc development current control comprises:

transition detector for detecting a rapid change in the voltage in said high intensity discharge lamp indicative of a transition from the glow state to the initial arc development in said high intensity discharge lamp; and frequency regulator, responsive to said detected rapid change in voltage in said high intensity discharge lamp, for changing the operating frequency to an intermediate frequency less than the frequency used to cause breakdown and greater than the final frequency of operation of said high intensity discharge lamp.

6. The control circuit of claim 5 wherein said frequency transition circuit comprises:

current control for raising said operating frequency of said current above said intermediate frequency prior to establishing the final frequency of operation of said high intensity discharge lamp.

7. The control circuit of claim 1 further comprising:

inrush current regulation circuit for limiting a turn-on inrush current in said high intensity discharge lamp ballast;

a transient protection circuit for providing transient protection to said high intensity discharge lamp ballast;

EMI reduction circuit for limiting electromagnetic interference generated by said high intensity discharge lamp ballast; and distortion regulator for reducing total harmonic distortion generated in said high intensity discharge lamp ballast.

8. A method of operating a control circuit that interconnects a source of AC voltage to a high intensity discharge lamp, for controlling the flow of current through said high intensity discharge lamp, the control circuit comprising:
supplying a predetermined open circuit voltage to said high intensity discharge lamp;
providing high frequency voltage pulses of predetermined magnitude with periodic intervals to said high intensity discharge lamp to create a breakdown of said high intensity discharge lamp to a glow state;
providing a controlled current at a controlled frequency into said high intensity discharge lamp, as said high intensity discharge lamp transitions from said glow state to the beginning phase of the arc state, for a stabilization period of no less than one second;
increasing the current into said high intensity discharge lamp following said stabilization period to a level that is not more than two times the normal operating current of said high intensity discharge lamp; and
switching, in response to said step of increasing the current, said high intensity discharge lamp to a low operating frequency at a normal operating current of said high intensity discharge lamp.

9. The method of operating a control circuit of claim 8 wherein said step of providing a controlled current is responsive to only the high intensity discharge lamp current, not the high intensity discharge lamp frequency or the sensed high intensity discharge lamp voltage, for controlling the high intensity discharge lamp current.

10. The method of operating a control circuit of claim 8 wherein said step of providing a controlled current comprises:
delivering, as soon as the high intensity discharge lamp enters into the arc phase, a controlled current of magnitude higher than the glow-to-arc state current and lower than the arc stabilization current for a period of not less than one second; and
delivering, in response to conclusion of operation of said initial arc development, a controlled current to said high intensity discharge lamp of magnitude higher than the initial arc development current and not more than two times the normal operating current until said high intensity discharge lamp reaches a normal operating state.

11. The method of operating a control circuit of claim 8, further comprising:
limiting asymmetrical current drawn in said high intensity discharge lamp and maintaining current in said high intensity discharge lamp at a level at least as great as the normal operating current of said high intensity discharge lamp.

12. The method of operating a control circuit of claim 8 wherein said step of increasing the current comprises:
detecting a rapid change in the voltage in said high intensity discharge lamp indicative of a transition from the glow state to the initial arc development in said high intensity discharge lamp; and
changing, in response to said detected rapid change in voltage in said high intensity discharge lamp, the operating frequency to an intermediate frequency less than the frequency used to cause breakdown and greater than the final frequency of operation of said high intensity discharge lamp.

13. The method of operating a control circuit of claim 12 wherein said step of increasing the current comprises:
raising said operating frequency of said current above said intermediate frequency prior to establishing the final frequency of operation of said high intensity discharge lamp.

14. The method of operating a control circuit of claim 8, further comprising:
limiting a turn-on inrush current in said high intensity discharge lamp ballast;
providing transient protection to said high intensity discharge lamp ballast;
limiting electromagnetic interference generated by said high intensity discharge lamp ballast; and
reducing total harmonic distortion generated by said high intensity discharge lamp ballast.

15. A control circuit that controls the flow of current through a high intensity discharge lamp via a lamp side inverter that interconnects a source of AC voltage to said high intensity discharge lamp, comprising:
generating a sequence of control signals, in response to current feedback from said high intensity discharge lamp, to regulate an arc current of said high intensity discharge lamp on a real time basis; and
applying a sequence of currents, in response to said sequence of control signals, of distinct magnitude, duration, and frequency, from said lamp side inverter to said high intensity discharge lamp, comprising:
breakdown voltage for providing periodic high frequency voltage pulses of predetermined magnitude with periodic intervals to said high intensity discharge lamp to create a breakdown of said high intensity discharge lamp to a glow state;
arc development current control for providing a controlled current at a controlled frequency into said high intensity discharge lamp, as said high intensity discharge lamp transitions from said glow state to the beginning phase of the arc state, for a stabilization period of no less than one second;
frequency transition for increasing the current into said high intensity discharge lamp following said stabilization period to a level that is not more than two times the normal operating current of said high intensity discharge lamp; and
power control for switching said high intensity discharge lamp to a low operating frequency at the normal operating current of said high intensity discharge lamp.

16. The control circuit of claim 15 wherein said arc development current control is responsive to only the high intensity discharge lamp current, not the high intensity discharge lamp frequency or the sensed high intensity discharge lamp voltage, for controlling the high intensity discharge lamp current.

17. The control circuit of claim 15 wherein said arc development current control comprises:
initial arc development, operable as soon as the high intensity discharge lamp enters into the arc phase, for delivering a controlled current of magnitude higher than the glow-to-arc state current and lower than the arc stabilization current for a period of not less than one second; and
arc stabilization, responsive to conclusion of operation of said initial arc development, for delivering a controlled current to said high intensity discharge lamp of a magnitude higher than the initial arc development current and not more than two times the normal operating current until said high intensity discharge lamp reaches a normal operating state.

18. The control circuit of claim 15, further comprising:
lamp rectification for limiting asymmetrical current drawn in said high intensity discharge lamp and maintaining current at a level at least as great as the operating current.

19. The control circuit of claim 15 wherein said arc development current control comprises:
transition detection for detecting a rapid change in the voltage in said high intensity discharge lamp indicative of a transition from the glow state to the initial arc development in said high intensity discharge lamp; and frequency regulation, responsive to said detected rapid change in voltage in said high intensity discharge lamp, for changing the operating frequency to an intermediate frequency less than the frequency used to cause breakdown and greater than the final frequency of operation of said high intensity discharge lamp.

20. The control circuit of claim 19 wherein said frequency transition comprises:

current control for raising said operating frequency above said intermediate frequency prior to establishing the final frequency of operation of said high intensity discharge lamp.

21. A control circuit that interconnects a source of AC voltage to a high intensity discharge lamp for controlling the flow of current through said high intensity discharge lamp, the control circuit comprising:

a lamp side inverter for applying a sequence of currents of distinct magnitude, duration, and frequency to said high intensity discharge lamp; and a line side converter for delivering a sequence of control signals to said lamp side inverter to regulate operation to said lamp side inverter, comprising:

inrush current regulation for limiting a turn-on inrush current in said high intensity discharge lamp ballast;

a transient process for providing transient protection to said high intensity discharge lamp ballast;

EMI reduction for limiting electromagnetic interference generated by said high intensity discharge lamp ballast; and distortion regulation for reducing total harmonic distortion generated by said high intensity discharge lamp ballast.

22. A method of controlling the flow of current through a high intensity discharge lamp via a lamp side inverter that interconnects a source of AC voltage to said high intensity discharge lamp, the method comprising:

generating a sequence of control signals, in response to current feedback from said high intensity discharge lamp, to regulate an arc current of said high intensity discharge lamp on a real time basis; and applying a sequence of currents, in response to said sequence of control signals, of distinct magnitude, duration, and frequency via a lamp side inverter to said high intensity discharge lamp, comprising:

providing periodic high frequency voltage pulses of predetermined magnitude with periodic intervals to said high intensity discharge lamp to create a breakdown of said high intensity discharge lamp to a glow state;

providing a controlled current at a controlled frequency into said high intensity discharge lamp, as said high intensity discharge lamp transitions from said glow state to the beginning phase of the arc state, for a stabilization period of no less than one second;

increasing the current into said high intensity discharge lamp following said stabilization period to a level that is not more than two times the normal operating current of said high intensity discharge lamp; and switching said high intensity discharge lamp to a low operating frequency at the normal operating current of said high intensity discharge lamp.

23. The method of operating a control circuit of claim 22 wherein said step of providing a controlled current is responsive to only the high intensity discharge lamp current, not the high intensity discharge lamp frequency or the sensed high intensity discharge lamp voltage, for controlling the high intensity discharge lamp current.

24. The method of operating a control circuit of claim 22 wherein said step of providing a controlled current comprises:

delivering, as soon as the high intensity discharge lamp enters into the arc phase, a controlled current of a magnitude higher than the glow-to-arc state current and lower than the arc stabilization current for a period of not less than one second; and delivering, in response to conclusion of operation of said initial arc development, a controlled current to said Discharge high intensity discharge lamp of a magnitude higher than the initial arc development current and not more than two times the normal operating current until said high intensity discharge lamp reaches a normal operating state.

25. The method of operating a control circuit of claim 22, further comprising:

limiting asymmetrical current drawn in said high intensity discharge lamp and maintaining current at a level at least as great as the operating current.

26. The method of operating a control circuit of claim 22 wherein said step of providing a controlled current comprises:

detecting a rapid change in the voltage in said high intensity discharge lamp indicative of a transition from the glow state to the initial arc development in said high intensity discharge lamp; and changing, in response to said detected rapid change in voltage in said high intensity discharge lamp, the operating frequency to an intermediate frequency less than the frequency used to cause breakdown and greater than the final frequency of operation of said high intensity discharge lamp.

27. The method of operating a control circuit of claim 22 wherein said step of increasing the current comprises:

raising said operating frequency above said intermediate frequency prior to establishing the final frequency of operation of said high intensity discharge lamp.

28. A method of operating a line side converter that interconnects a source of AC voltage to a high intensity discharge lamp via a lamp side inverter, for controlling the flow of current through said high intensity discharge lamp, the method comprising:

applying a sequence of currents of distinct magnitude, duration, and frequency via a lamp side inverter to said high intensity discharge lamp; and delivering a sequence of control signals from said line side converter to said lamp side inverter to regulate operation of said lamp side inverter, comprising:

limiting a turn-on inrush current in said high intensity discharge lamp ballast;

providing transient protection to said high intensity discharge lamp ballast;

limiting electromagnetic interference generated by said high intensity discharge lamp ballast; and reducing total harmonic distortion generated by said high intensity discharge lamp ballast.

* * * * *